(12) United States Patent
Ikeda

(10) Patent No.: US 8,449,148 B2
(45) Date of Patent: May 28, 2013

(54) LIGHTING DEVICE FOR FORMING PATTERN

(75) Inventor: Takahiro Ikeda, Hamamatsu (JP)

(73) Assignee: Pi Photonics, Inc., Shizuoka (JP)

( * ) Notice: Subject to any disclaimer, the term of this patent is extended or adjusted under 35 U.S.C. 154(b) by 0 days.

(21) Appl. No.: 13/120,413

(22) PCT Filed: Aug. 23, 2010

(86) PCT No.: PCT/JP2010/064164
§ 371 (c)(1),
(2), (4) Date: Mar. 22, 2011

(87) PCT Pub. No.: WO2011/033906
PCT Pub. Date: Mar. 24, 2011

(65) Prior Publication Data
US 2012/0162996 A1 Jun. 28, 2012

(30) Foreign Application Priority Data

Sep. 18, 2009 (JP) .................................. 2009-216528
Sep. 25, 2009 (JP) .................................. 2009-221061

(51) Int. Cl.
*F21V 33/00* (2006.01)

(52) U.S. Cl.
USPC ........................ 362/311.02; 362/285; 362/326

(58) Field of Classification Search
USPC .............................. 362/326, 311.02, 285–289
See application file for complete search history.

(56) References Cited

U.S. PATENT DOCUMENTS

| 2005/0201101 A1* | 9/2005 | Shimura ........................ 362/330 |
| 2009/0290336 A1* | 11/2009 | Senzaki et al. ................. 362/231 |
| 2010/0080002 A1* | 4/2010 | Kadar-Kallen ............... 362/287 |

FOREIGN PATENT DOCUMENTS

| JP | 60-59406 | 4/1985 |
| JP | 61-147496 | 9/1986 |
| JP | 07-325550 | 12/1995 |
| JP | 09-063342 | 3/1997 |
| JP | 2000-057813 | 2/2000 |
| JP | 2005-056689 A | 3/2005 |
| JP | 2005-285697 A | 10/2005 |
| JP | 2008-210712 A | 9/2008 |

OTHER PUBLICATIONS

ISA Japanese Patent Office, International Search Report of PCT/JP2010/064164, Feb. 1, 2011, 3 pages.

* cited by examiner

*Primary Examiner* — Laura Tso
(74) *Attorney, Agent, or Firm* — Alleman Hall McCoy Russell & Tuttle LLP

(57) ABSTRACT

The present invention is capable of irradiating a desired figure, a character and the like onto an object with a simple configuration and further capable of easily changing the figure, the character and the like, and includes an LED light source, a first refractive element adapted to refract light emitted from the LED light source to form an image of a light emitting shape when viewed in an optical axis direction of the LED light source at a predetermined position and a casing accommodating the LED light source and the first refractive element and having a light outgoing aperture for emitting the light applied from the first refractive element to the outside.

8 Claims, 20 Drawing Sheets

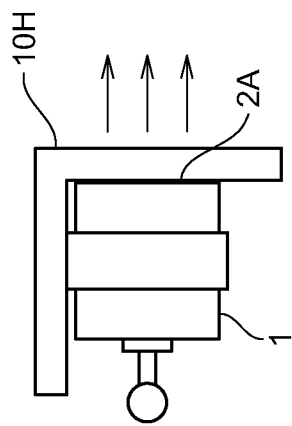
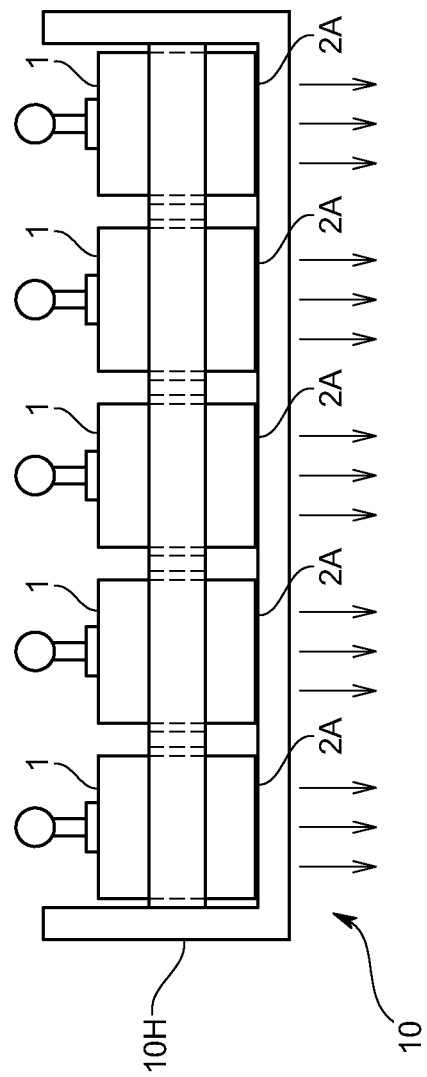
FIG. 2

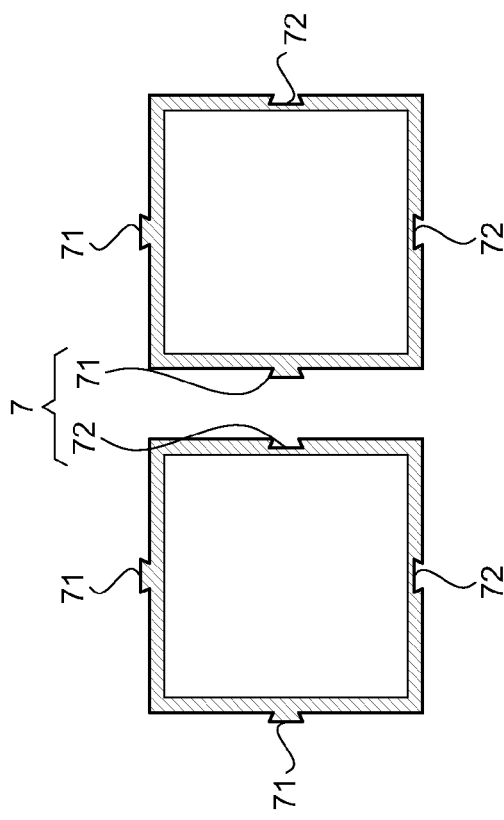
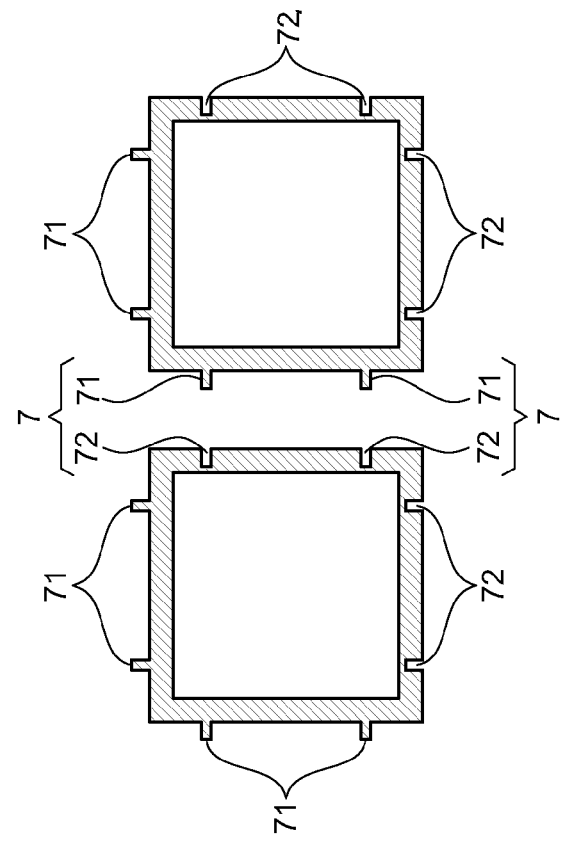
FIG. 12 (B)
FIG. 12 (A)

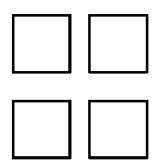
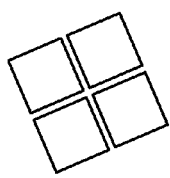
SHAPE OF LIGHT
EMITTING SURFACE
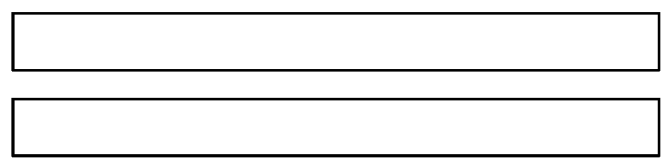
SHAPE OF IMAGE
PROJECTED ON ROAD SURFACE
FIG. 19 (a)
FIG. 19 (b)

LIGHTING DEVICE FOR FORMING PATTERN

TECHNICAL FIELD

The present invention relates to a lighting device for forming a pattern for irradiating light of a predetermined shape such as a figure, a character, a symbol or a pattern onto an object such as, for example, a mountain, a building or a structure.

BACKGROUND ART

Conventionally, as a lighting device for projecting light illumination of a desired pattern onto an irradiation surface, there is known a lighting device as disclosed in, for example, Patent Literature 1, which includes a light source, an optical member for converting emitted light from the light source into parallel light, a projection lens for projecting the parallel light from the optical member onto an emission surface and a shading mask having an aperture opened in correspondence with a pattern and placed in the vicinity of a focus in a side of the light source of the projection lens.

However, in the arrangement of placing the shading mask in the side of the light source of the projection lens, there is a problem that the structure is complicated. Also, quantity of light is reduced by providing the shading mask and there arises a problem that, for example, in the case where a pattern image is projected far away, the corresponding image becomes blurred. Further, in a configuration of forming a pattern by a shading mask, for example, in the case where a pattern image is projected far away, a magnifying lens is required to be provided in addition if the pattern is magnified and irradiated, and there arises a problem that the structure is further complicated. In addition, when a pattern is changed, there is a problem in workability that it is necessary to disassemble an irradiating device to replace the shading mask.

CITATION LIST

Patent Literature

Patent Literature 1: JP2008-210712A

SUMMARY OF INVENTION

Technical Problem

In consideration of the problems mentioned above, the present invention has been made apart from an idea of arranging a member having an aperture corresponding to a pattern between a light source and a projection lens, and an essential object of the present invention is to provide a lighting device for forming a pattern with a simple configuration capable of irradiating light of a predetermined shape such as a desired figure, character, symbol or pattern onto an object and further capable of easily changing the figure, the character, the symbol, the pattern or the like.

Solution to Problem

That is, a lighting device for forming a pattern according to the present invention is characterized by including: a LED light source using a LED light emitting element; a first refractive element adapted to refract light emitted from the LED light source to form an enlarged image of a light emitting shape when viewed in an optical axis direction of the LED light source at a predetermined position; and a casing accommodating the LED light source and the first refractive element and having a light outgoing aperture for emitting the light applied from the first refractive element to the outside.

With this configuration, an image of a light emitting shape when viewed in the optical axis direction of the LED light source can be formed at a predetermined position on an object and the like. Thus, the irradiation shape on the object can be changed by changing, e.g., a shape of the LED light source without providing another member between the light source and an image-forming lens, or the irradiation shape on the object can be also changed by combining a plurality of lighting devices for forming a pattern. Moreover, the irradiation shape can be enlarged by representing a predetermined irradiation shape by arranging a plurality of lighting devices for forming a pattern, so that the light of a predetermined shape such as a desired figure, character, symbol or pattern can be also irradiated onto a distant object without using a magnifying lens and the like.

It is desirable to further provide a second refractive element so that the light outputted from the first refractive element is extended in a predetermined direction and the image of the light emitting shape when viewed in the optical axis direction of the LED light source is deformed to be a predetermined shape. At this time, the LED light source, the first refractive element and the second refractive element are arranged in the casing, and the first refractive element has a function of enlarging an image of the LED light source to be formed at a predetermined distance, and the second refractive element has a function of extending the enlarged image of the light emitting shape when viewed in the optical axis direction of the LED light source, in a predetermined direction. Thus, an image of a light emitting surface of the LED light source can be deformed to be a predetermined shape to be irradiated onto the object. Since the deformed image is not formed of parallel light but formed of nonparallel light, an occurrence of a trouble such that a contour of the irradiation shape becomes blurred can be prevented so that the irradiation shape can be formed on the object with a clear contour thereof.

For example, in the case where a plurality of lighting devices for forming a pattern are arranged in series in a vertical or horizontal direction, if a surface of an object is tilted with respect to the plurality of lighting devices or in a like case, the distances between the respective lighting devices and the surface of the object are different and the image-forming positions by the first refractive element may be possibly displaced from the surface position of the object. In order to solve this problem, it is desirable that the lighting device for forming a pattern is provided with a distance variable mechanism for making the distance between the LED light source and the first refractive element variable so that the image-forming position can be varied for every lighting device for forming a pattern.

When an irradiation shape of a figure, a character, a symbol, a pattern or the like is formed using a plurality of lighting devices for forming a pattern, in order to facilitate the formation of an irradiation shape while uniformly irradiating without non-uniform irradiation, it is desirable that a light emitting shape when viewed in an optical axis direction of the LED light source is rectangular. At this time, a unit component of the irradiation shape becomes rectangular.

In order to improve workability by forming an image of the light emitting shape when viewed in the optical axis direction of the LED light source and by making it possible to confirm the shape of the light emitting surface only by confirming a shape of the first refractive element, it is desirable that the light emitting shape when viewed in the optical axis direction of the LED light source and the shape of the first refractive element are similar to each other.

Further, it is desirable that the first refractive element and the light outgoing aperture have substantially the same shape so that the light emitting shape when viewed in the optical axis direction of the LED light source and the shape of the first refractive element are similar to each other.

In order to reduce the number of components for use in the lighting device for forming a pattern so as to be able to produce an image of a predetermined shape with a simple configuration, it is desirable that a plate shaped optical element is further included and the first refractive element is formed on one surface thereof and the second refractive element is formed on the other surface thereof.

In order to facilitate attachment of the first refractive element to the casing and positioning thereof while simplifying the configuration of the lighting device for forming a pattern with reduction in cost, it is desirable that, the casing is provided with an abutment surface that is located on a folded portion formed by inwardly folding an edge portion which defines the light outgoing aperture so that an abutment surface abuts to the first refractive element and that the casing is provided with a positioning protrusion for positioning and fixing the first refractive element in a state that the first refractive element is moved toward the abutment surface within the casing so that the first refractive element is in contacted with the abutment surface.

Advantageous Effects of Invention

According to the present invention configured as mentioned above, it becomes possible to provide a lighting device for forming a pattern capable of irradiating light of a predetermined shape of such as a desired figure, character, symbol or pattern onto an object with a simple configuration and further capable of easily changing the figure, the character, the symbol, the pattern or the like.

BRIEF DESCRIPTION OF DRAWINGS

FIG. 2 is a schematic diagram showing a unit group of the same embodiment;

FIG. 12 is a diagram showing a coupling mechanism according to a modified embodiment;

FIG. 19 is a schematic diagram showing a shape of a light emitting plane of the LED light source in the road line producing lighting device and an image projected onto a surface of a road according to another embodiment of the present invention;

DESCRIPTION OF EMBODIMENTS

First Embodiment

Figure 1:
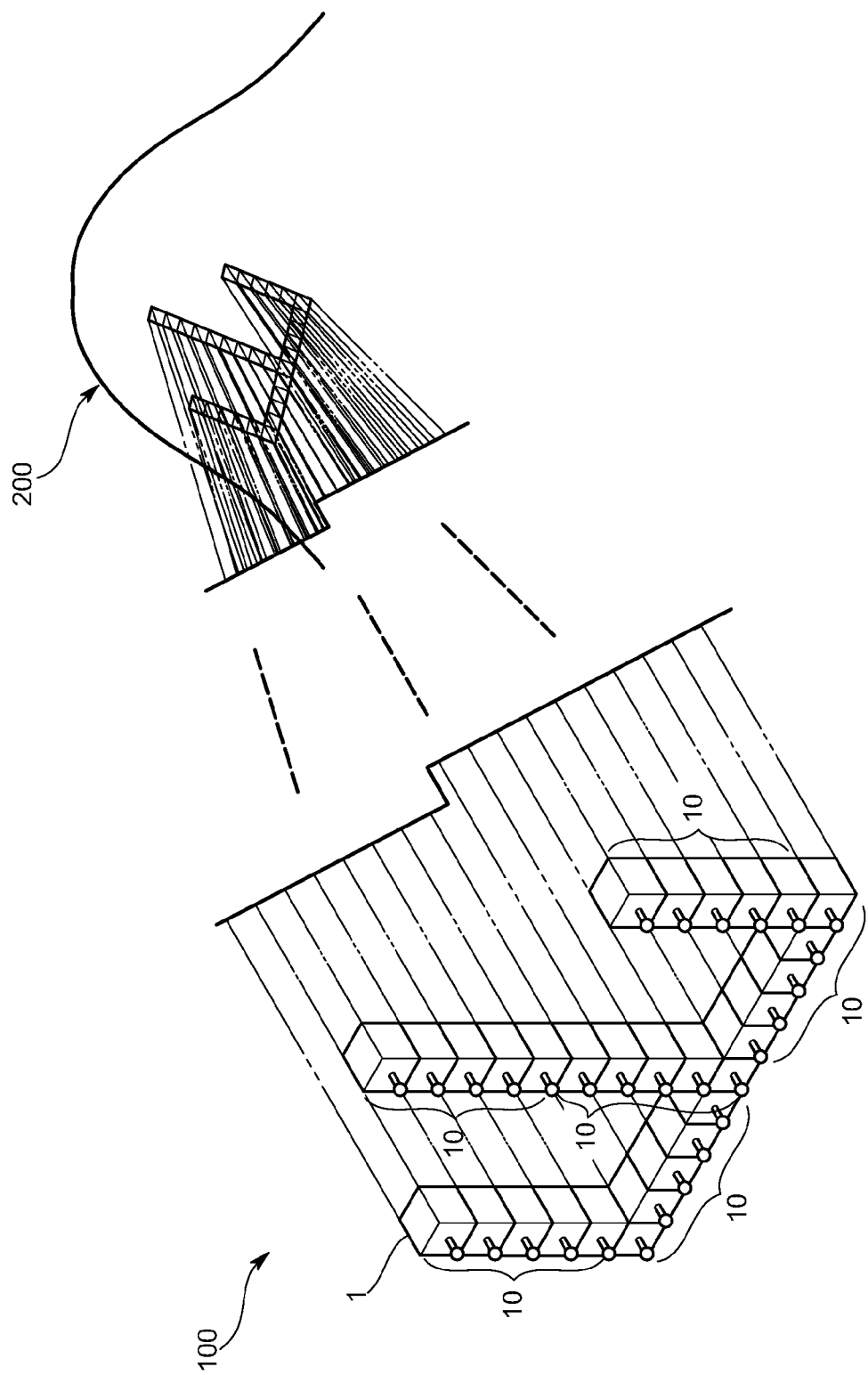
FIG. 1 is a schematic configuration diagram of a light irradiating system according to a first embodiment of the present invention.

The following describes a light irradiating system using a lighting device according to a first embodiment referring to the drawings.

A light irradiating system 100 according to the present embodiment displays a light projection of a predetermined shape of a desired figure, character, symbol, pattern or the like onto a surface of a distant object (e.g., a mountain, building, structures such as pyramids and the like) 400 to 500 m away as shown in FIG. 1. In FIG. 1, there is shown a case of displaying a character of "mountain" on a ground of the mountain.

Figure 3:
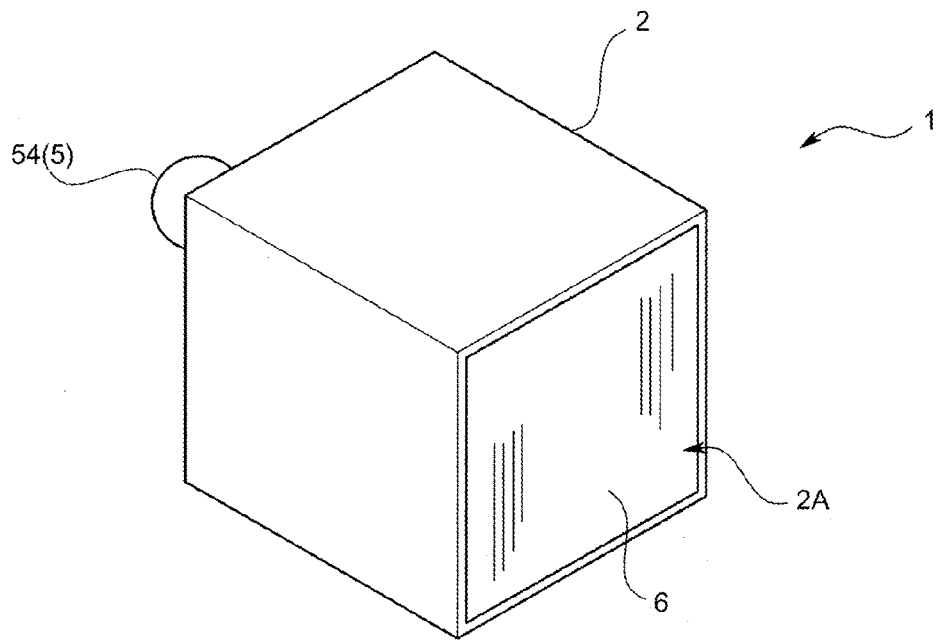
FIG. 3 is a perspective view of a lighting device for forming a pattern according to the same embodiment.

Specifically, as shown in FIGS. 2 and 3, the system 100 includes a plurality of unit groups 10 formed by linearly (serially) coupling a plurality of lighting devices 1 for forming a pattern, each having a generally rectangular parallelepiped shape. In FIG. 2, (A) is a plan view of the unit group 10, and (B) is a side view of the unit group 10.

The unit group 10 includes the plurality of lighting devices 1 (five devices in FIG. 2) serially coupled by a coupling holder 10H in a manner that apertures (light outgoing apertures) 2A thereof are oriented generally in the same direction and the respective apertures 2A are coplanar.

Although the arrangement aspect of the plurality of unit groups 10 can be appropriately determined according to an irradiation shape of a figure, a character, a symbol or a pattern to be displayed, in the case where a character of, e.g., "mountain" is displayed on a surface of a mountain, for example, six unit groups 10 are arranged in a shape of a character "mountain" (see FIG. 1). By forming the unit groups 10 like this, the workability can be improved such as facilitating of the handling at the time of assembling the light irradiating system 100 or changing the arrangement thereof.

Figure 4:
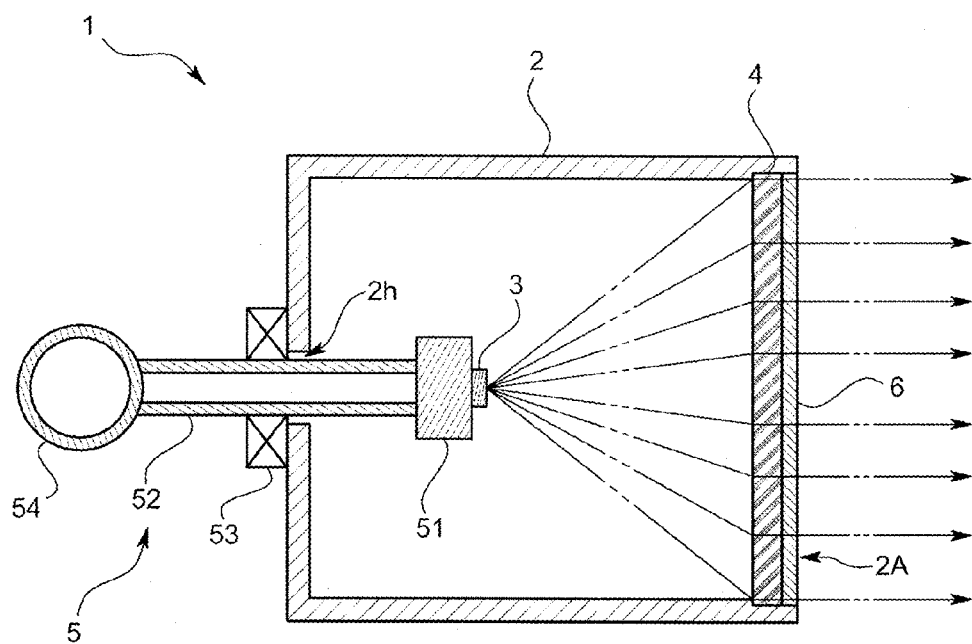
FIG. 4 is a schematic section view of the lighting device for forming a pattern according to the same embodiment.

Next, a configuration of the lighting device 1 is described. As shown in FIGS. 3 and 4, the lighting device 1 according to the present embodiment includes a casing 2, an LED light source 3, an image-forming lens 4 that is a first refractive element, and a position adjusting mechanism 5.

Each of the parts 2 to 5 is described below.

The casing 2 has an aperture 2A serving as a light outgoing aperture in a generally rectangular front plane and has a generally rectangular parallelepiped shape and, specifically, has a hollow-box shape with the whole part of the front plane almost opened. An inner circumferential surface of the casing 2 is subjected to a light shielding treatment (for example, black surface treatment and the like) in order to prevent the light from reflecting. Further, in the aperture portion 2A of the casing 2, one image-forming lens 4 and a sheet of protection member 6 for protecting the image-forming lens 4 are provided frontward (i.e., toward the light outgoing side) in this order. The protection member 6 is a transparent thin plate made of an acryl resin and is almost in close contact with the image-forming lens 4. Further, in a back plane of the casing 2, there is provided a through-hole 2h through which an operation coupling portion 52 of a position adjusting mechanism 5, as to be described later, is passed.

Figure 5:
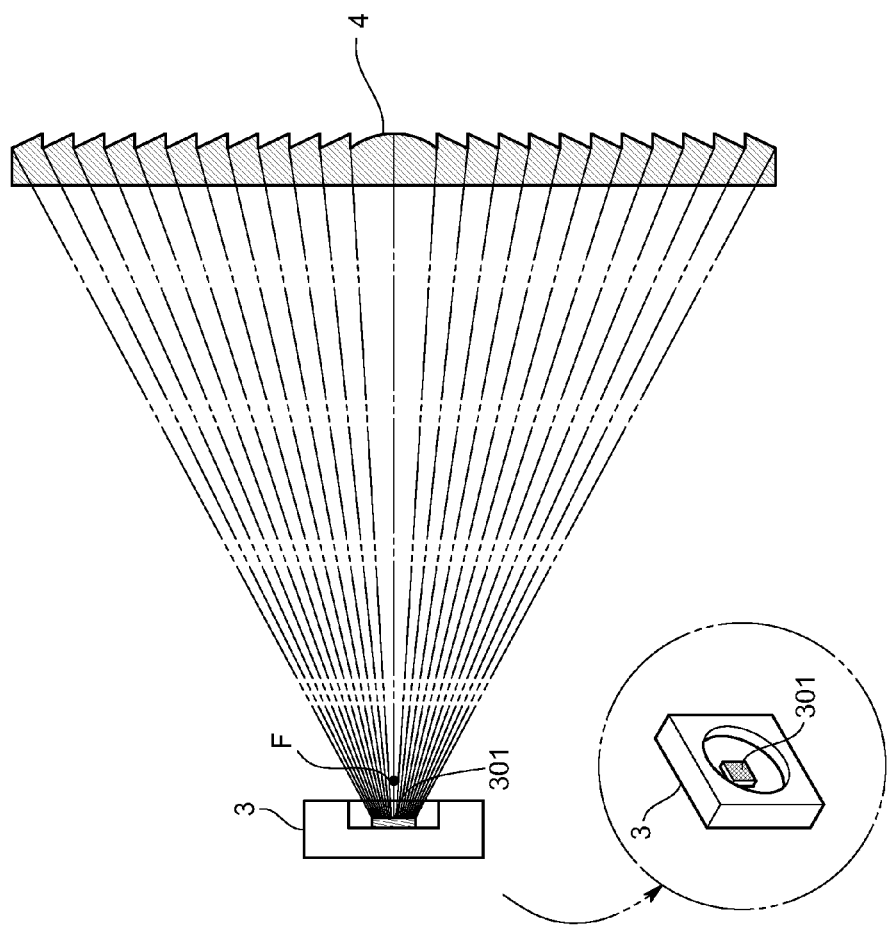
FIG. 5 is a schematic diagram showing a positional relationship between a light emitting plane and an image-forming lens according to the same embodiment.

The LED light source 3 is provided in the casing 2 and serves as a surface light source for emitting light toward the image-forming lens 4, and specifically, as shown in FIG. 5, the LED light source 3 is provided so that a light emitting surface 301 having a light emitting shape when viewed in the optical axis direction is positioned in the vicinity of a focus position of the image-forming lens 4. A symbol F in FIG. 5 denotes a front focus of the image-forming lens, and the light emitting surface 301 is provided at a position slightly outside than the front focus F, that is, the light emitting surface 301 of the LED light source 3 is positioned slightly farther away from the image-forming lens 4 than the front focus F (i.e., in a manner that a distance between the light emitting surface 301 and the image-forming lens 4 is slightly larger than the distance between the front focus F and the image-forming lens 4). The LED light source 3 of the present embodiment is a single unit LED for emitting monochromatic (R, G, B) or white light. Further, the LED is, for example, a surface mounting type with its light emitting surface being rectangular. With the generally rectangular parallelepiped shaped casing 2 having the aperture portion 2A of a generally quadrangle (rectangular) shape that is analog to the light emitting surface 301, a shape of a unit component irradiated by the lighting device 1 can be recognized through intuition.

The image-forming lens 4 is provided in the aperture portion 2A of the casing 2 so that the light emitting surface 301 is projected onto an object 200 to form an enlarged image thereof. The image-forming lens 4 is provided in the aperture portion 2A of the casing 2 (almost the entire front surface of the casing 2) and has substantially the same shape as that of the aperture portion 2A when viewed in the optical axis direction. In the present embodiment, the casing 2 has a cubic shape and the image-forming lens 4 has a square shape when viewed in the optical axis direction. That is, the lighting device 1 is adapted to emit light from the entire one surface of the cubic unit. Further, the shape of the image-forming lens 4 is analogous to the shape of the light emitting surface 301 of the LED light source 3. It is preferable to use a lightweight and thin typed resin Fresnel lens as the image-forming lens 4 in order to reduce the weight of the entire lighting device 1.

The position adjusting mechanism 5 includes a distance variable mechanism for varying the distance between the LED light source 3 and the image-forming lens 4 and is provided with a gripping portion 54 outside the casing 2, whereby the position of the LED light source 3 with respect to the image-forming lens 4 is adjusted by operating the gripping portion 54. The configuration of the distance variable mechanism includes a light source holding portion 51, an operation coupling portion 52 and a supporting portion 53.

The light source holding portion 51 holds the LED light source 3 and is arranged in the casing 2 and further functions as a heat-sink portion for dissipating heat generated by the LED light source 3 in the present embodiment. In order to effect the function as the heat-sink portion, the light source holding portion 51 may be formed of a high heat conductive material such as, e.g., aluminum and the like and further may be provided with a radiator fin.

The operation coupling portion 52 has its one end connected to the light source holding portion 51 and the other end attached to the gripping portion 54 and has a rod shape passing through the through hole formed in the back plane of the casing 2. A heat-sink mechanism such as a radiator fin may be provided in the operation coupling portion 52.

The gripping portion 54 has a generally spherical shape, which is attached to the outer end of the operation coupling portion 52 located outside the casing 2. Further, the gripping portion 54 is colored with the same color as that of the light emitted by the LED light source 3. Thus, the color of the illumination light of each of the light irradiating units 1 can be easily visually confirmed at the time of assembling so that the workability of assembling can be improved.

The supporting portion 53 is interposed between the casing 2 and the operation coupling portion 52 and is adapted to support the operation coupling portion 52 such that the light holding portion 51 is moved when the gripping portion 54 is operated. The supporting portion 53 in the present embodiment is provided in the vicinity of a circumference of the through hole 2h formed in the rear wall of the casing 2 so that the operation coupling portion 52 is supported slidably and rotatably with the supporting portion 53 as a center of rotation by operating the gripping portion 54 while fixing the operation coupling portion 52 to the rear wall of the casing 2. It is considered to configure this supporting portion 53 by a spherical plain bearing (e.g., a pillow ball). Alternatively, the supporting portion 53 may be configured by a set screw for pressurizing and fixing the operation coupling portion 52 from the circumferential direction, or may be configured by an elastic member.

Figure 6:
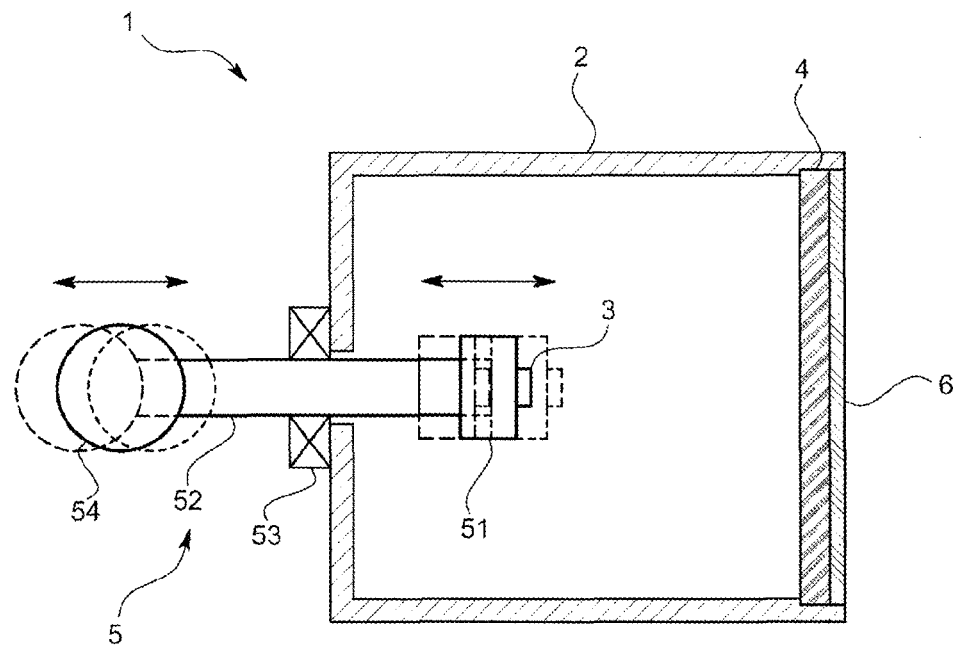
FIG. 6 is a diagram showing an action of a position adjusting mechanism.
Figure 7:
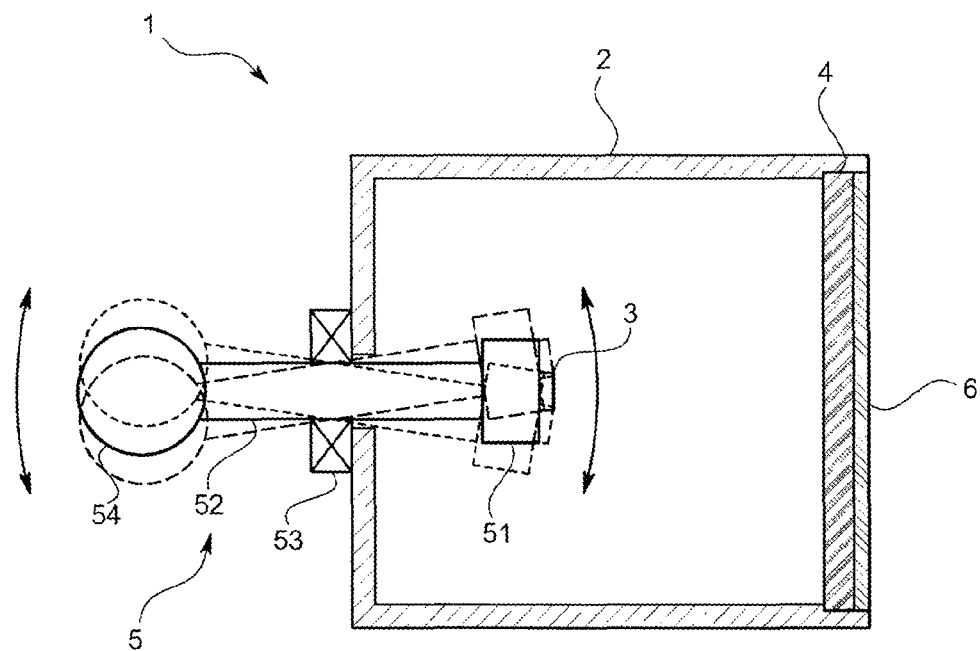
FIG. 7 is a diagram showing an action of a position adjusting mechanism.

In particular, as shown in FIG. 6, by pulling the gripping portion 54 backward, the operation coupling portion 52 is slid with respect to the supporting portion 53 so that the LED light source 3 can be moved close to or away from the image-forming lens 4. Thus, the image-forming position of the light projected from the image-forming lens 4 can be adjusted frontward and rearward with respect to the object 200. Moreover, as shown in FIG. 7, by moving the gripping portion 54 upward and downward, the operation coupling portion 52 is rotated with the supporting portion 53 as a center of rotation so that the LED light source 3 can be moved upward and downward. Thus, the irradiating direction of the light projected from the image-forming lens 4 can be changed. Also, the supporting portion 53 in the present embodiment has a function of preventing the light emitted by the LED light source 3 from leaking through the through hole 2h.

Further, in the light irradiating system 100 according to the present embodiment is provided with a power source 9 for each of the unit groups 10.

Figure 8:
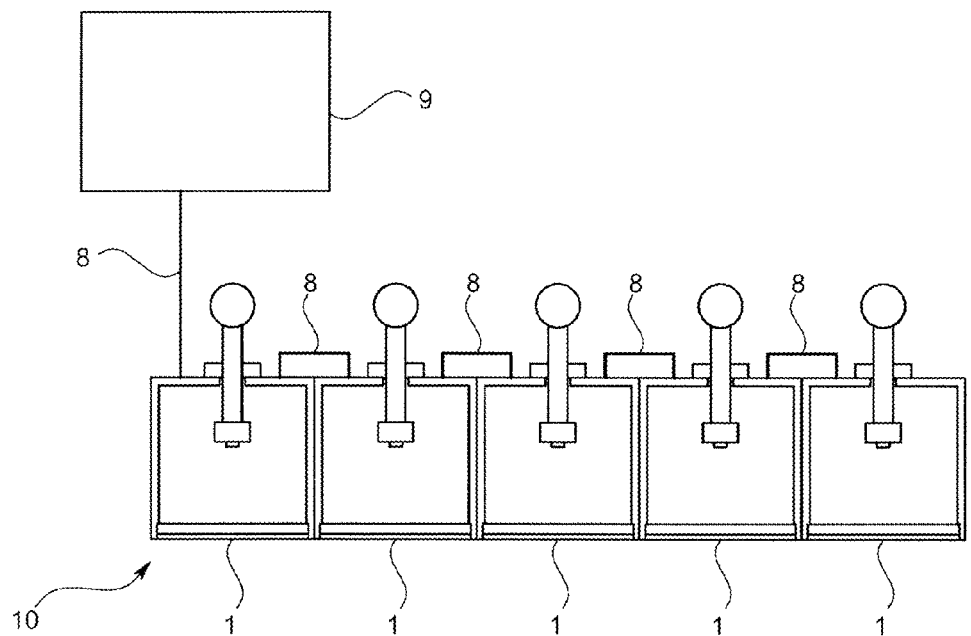
FIG. 8 is a diagram showing a power supplying method.
Figure 9:
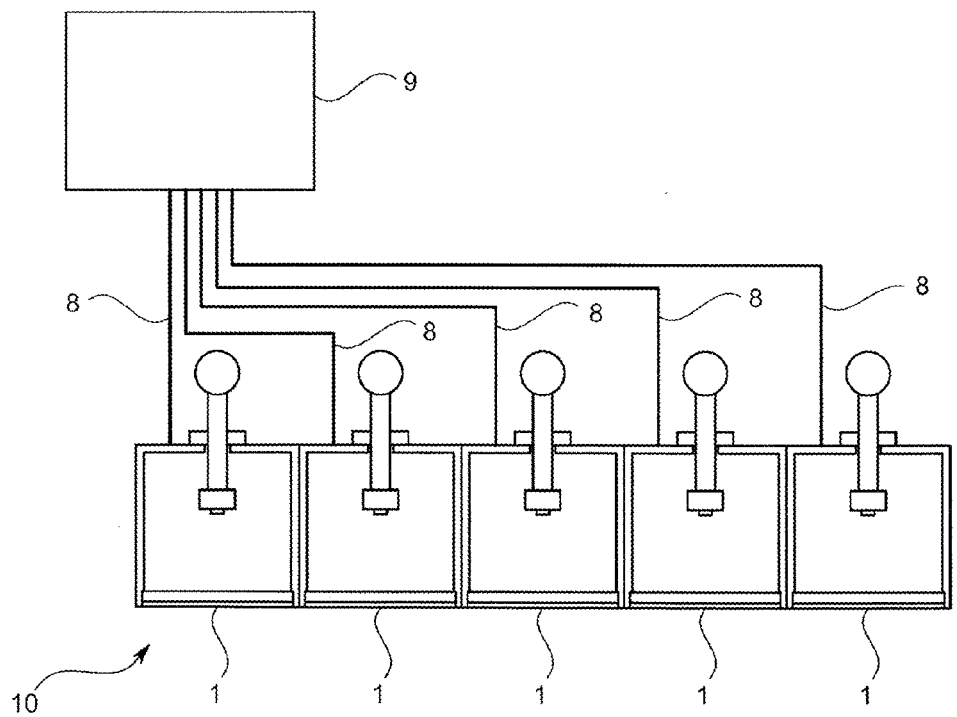
FIG. 9 is a diagram showing a power supplying method.

As a method of supplying power to each of the LED light sources 3 in each of the unit groups 10, as shown in FIG. 8, it may be configured such that the respective lighting devices 1 are electrically interconnected by a power supply line 8 and the LED light source 3 of each of the lighting devices 1 is serially connected to the power source 9 so that the power is supplied to each of the LED light sources 3. Also, as shown in FIG. 9, it may be configured such that the power is supplied to the LED light sources 3 of the respective lighting devices 1 via respective power supply lines 8 without electrically interconnecting the respective lighting devices 1 by a power supply line 8.

The following describes an irradiation shape of a figure, a character, a symbol, a pattern or the like by the light irradiating system 100 according to the present embodiment and an action of the light irradiating system 100.

The figure, the character, the symbol or the pattern formed on the object 200 by the light irradiating system 100 includes an assembly of the enlarged images of the light emitting surfaces 301 of the lighting devices 1 formed on the surface of the object 200. In the present embodiment, since the light emitting surface 301 of the LED light source 3 is rectangular, the figure, the character, the symbol or pattern is formed of an assembly of rectangular unit components.

Moreover, each of the LED light sources 3 is independently adjusted by the position adjusting mechanism 5 of every lighting device 1 so that each of the respective enlarged images of the light emitting surfaces 301 of the LED light sources 3 of the lighting devices 1 can be formed on the slanting surface of the object 200.

Further, the plurality of lighting devices 1 are arranged in a manner that the arrangement of the plurality of lighting devices 1 corresponds to the irradiation shape formed on the object 200 by the plurality of lighting devices 1. Thus, the irradiation shape formed on the object 200 by the plurality of lighting devices 1 can be made variable by varying the arrangement of the plurality of lighting devices 1. In the present embodiment, since the unit groups 10 are configured in a unit of a plurality of groups, the irradiation shape formed on the object 200 is varied by varying the arrangement of the plurality of unit groups 10.

Figure 10:
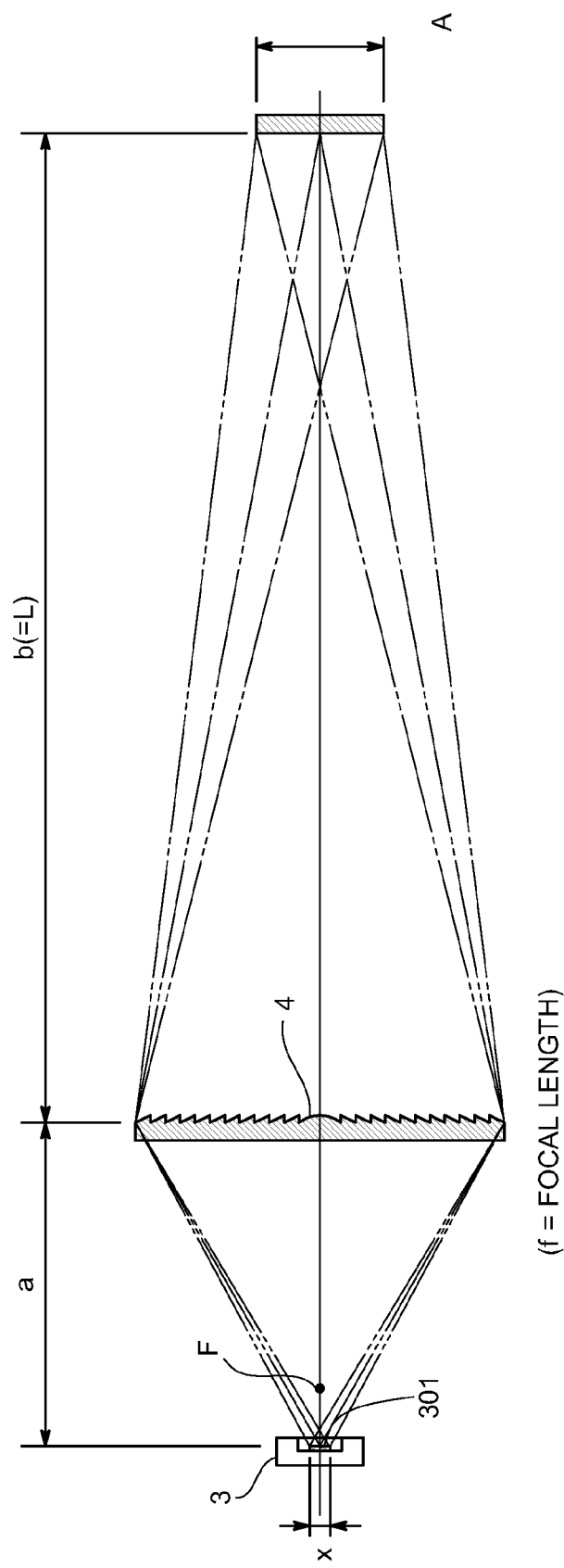
FIG. 10 is a diagram showing a relationship between the light emitting plane, the image-forming lens and a unit component.

Finally, the relationship among the light emitting surface 301 of the LED light source 3, the image-forming lens 4 and the unit component will be explained referring to FIG. 10. As shown in FIG. 10, in the case of forming an enlarged image by a single image-forming lens 4, the image formed of the light emitting surface 301 of the LED light source 3 is vertically and horizontally inverted. It is assumed that, a distance between the light emitting surface 301 of the LED light source 3 and a principal point of the image-forming lens 4 is "a", a distance between the principal point of the image-forming lens 4 and an image surface (the surface of the object 200) is "b", and a focal length of the image-forming lens 4 is "f".

Since $a = bf/(b-f)$ is established based on a mathematical formula of a lens ($1/a + 1/b = 1/f$), in order to form and illuminate an image of the light emitting surface 301 at a position of b=1 m using the image-forming lens 4 of a focal length f=100 mm, $a = 100 \times 1000/(1000-100) = 111.11$ mm is required.

In order to form and illuminate an image of the light emitting surface 301 at a position of b=10 m using the image-forming lens 4 of a focal length f=100 mm, $a = 100 \times 10000/(10000-100) = 101.01$ mm is required.

In order to form and illuminate an image of the light emitting surface 301 at a position of b=100 m using the image-forming lens 4 of a focal length f=100 mm, $a = 100 \times 100000/(100000-100) = 100.10$ mm is required.

In order to form and illuminate an image of the light emitting surface 301 at a position of b=500 m using the image-forming lens 4 of a focal length f=100 mm, $a = 100 \times 500000/(500000-100) = 100.02$ mm is required.

As described above, the more distant the image surface (the surface of the object 200) is, the smaller the movement amount of the light emitting surface 301 with respect to the image-forming lens 4 becomes.

A size A (only a height size is shown in FIG. 10) of a unit component of an image to be formed on the image surface (the surface of the object 200) is obtained by a formula $A = xL/a$ using a size x (only a height size is shown in FIG. 10) of the light emitting surface 301 of the LED light source 3, the distance a between the light emitting surface 301 of the LED light source 3 and the principal point of the image-forming lens 4 and a lighting distance L (i.e., the distance b between the principal point of the image-forming lens 4 and the image surface).

For example, assuming that the size x of the light emitting surface is x=2 mm, the focal length f of the image-forming lens 4 is f=100 mm, the lighting distance L=500 m, and the distance a between the light emitting surface 301 of the LED light source 3 and the principal point of the image-forming lens 4 is a=100.02 mm, a size A of a unit component of an image to be formed is $A = 2 \times 500000/100.02$ mm = 9998 mm (≈10 m). That is, in the case where the LED light source 3 of the light emitting surface 301 of 2 mm square is used, the unit component of an image to be formed is 10 m square. If the size of the light emitting surface 301 is excessively large, the unit component becomes large in size. In consideration of practical use, the size of the light emitting surface 301 is desirably within 10 *mm* square.

Effect of First Embodiment

According to the light irradiating system 100 pertaining to the present embodiment as configured above, an image of a shape of the light emitting surface 301 of the LED light source 3 can be formed on a predetermined position of the object 200 and the like. Thus, the irradiation shape on the object 200 can be changed even by combining a plurality of lighting devices 1 without arranging any other member between the LED light source 3 and the image-forming lens 4. Further, by representing a predetermined irradiation shape by arranging the plurality of lighting devices 1, the irradiation shape can be enlarged, whereby the light of a predetermined shape such as a desired figure, character, symbol or pattern can be irradiated onto, e.g., a distant object 200 without using a magnifying lens and the like.

It is noted that the present invention is not limited to the first embodiment. In the following description, like parts corresponding to those of the first embodiment are designated by the same reference symbols.

For example, although a surface mounting type LED having a rectangular light emitting surface is used as the LED light source in the first embodiment, another type of LED having a light emitting surface of a different shape (e.g., circular) or a shell type LED may be used. For example, in the case of using a shell type LED of 3 mm diameter, the light emitting shape when viewed in the optical axis direction becomes a shape of a cross-section of a shell type resin mold portion. Also, a light source using an organic EL (electroluminescent), etc. other than an LED may be used.

Moreover, although the LED light source in the first embodiment includes only an LED, the light source may include an LED and a rod lens that diffuses the light from the LED and emits the diffused light. In this case, the light outgoing surface of the rod lens is located in the vicinity of the focus position of the image-forming lens so that the image-forming lens forms an image of the light outgoing surface of the rod lens on the object. Further, the LED light source may include an LED and an optical fiber for transferring the light from the LED.

Further, in the first embodiment, although the light irradiating system is configured using a plurality of unit groups assembled by coupling a plurality of lighting devices by a coupling holder for easy treatment, the configuration may be made variable in arrangement every lighting device without assembling a unit group. Moreover, each of the unit groups is not limited to a linear arrangement in series, various shapes such as a partially arc-shaped or a generally L character shaped one can be adopted.

In addition, although a Fresnel lens is used as the image-forming lens in the first embodiment, a convex lens may be used.

Moreover, the number of the lighting devices configuring each of the unit groups and the number of the unit groups and the arrangement configuration thereof are not limited to those of the above embodiment, it is needless to say that the numbers thereof can be appropriately changed according to an irradiation shape irradiated on the object.

Figure 11:
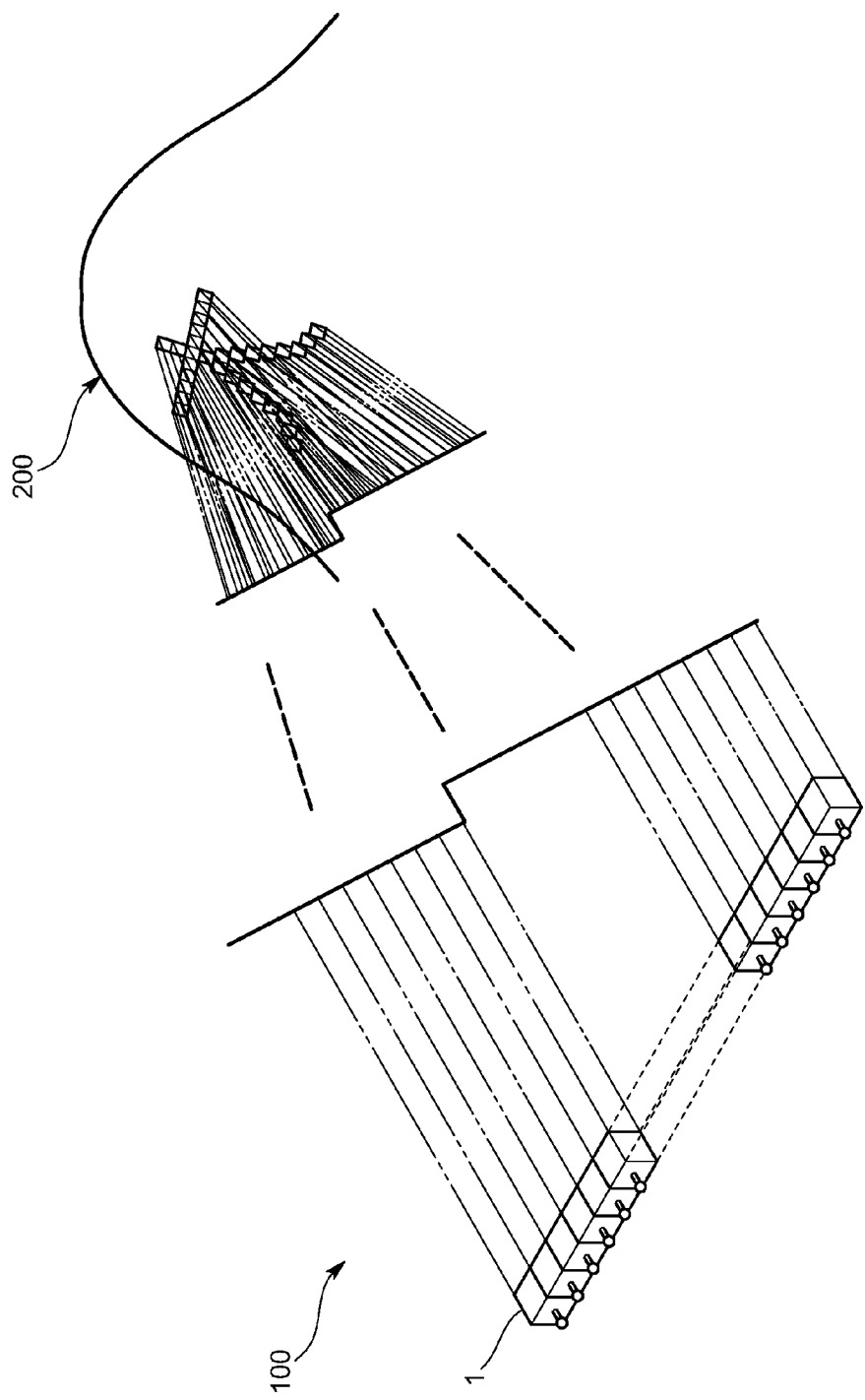
FIG. 11 is a schematic configuration diagram of a light irradiating system according to a modified embodiment.

Further, in the first embodiment, although a plurality of lighting devices 1 are arranged in conformance with an irradiation shape, the plurality of lighting devices 1 may be arranged in one or plural lines to adjust an irradiation direction by a setting angle of each of the lighting devices 1 or the position adjusting mechanism 5 to thereby represent a predetermined irradiation shape. FIG. 11 shows a case where a plurality of lighting devices 1 are arranged in one line and a setting angle in a vertical or a horizontal direction of each of the lighting devices 1 or an irradiation direction in the vertical direction or horizontal direction is adjusted by the position adjusting mechanism 5 to thereby display a character such as a "Dai" kanji on a surface of a mountain.

In addition, by differentiating a color of each of the lighting devices or by differentiating a color of a light source every unit group, it may be possible to have a configuration to irradiate a pattern of a plurality of colors on the object. As an example of the pattern, a grid pattern such as a checker or a streak pattern, etc. can be used.

Furthermore, in the first embodiment, although a power source is provided for each of the unit groups, only a single power source may be provided for supplying electric power to all of the unit groups.

Moreover, although the casing in the first embodiment has a generally rectangular parallelepiped shape, the casing may have a different shape such as a generally circular column shape with its rear face (and front face) being generally circular, a generally equilateral triangular column shape with its rear face (and front face) being generally equilateral triangular, a generally equilateral hexagonal column shape with its rear face (and front face) being generally equilateral hexagonal, or the like. At this time, the shape of the unit component irradiated by each of the light irradiating units can be recognized through intuition so long as the shape of the rear face (and front face) is analog to that of the light emitting surface of the light source.

Further, in the first embodiment, although the aperture portion is formed in the almost entire face of the front face of the casing and a light conducting lens has the generally same shape as that of the aperture portion, the aperture portion may not be formed in the almost entire face of the front face of the casing and the light conducting lens may have a different shape from that of the aperture portion.

Furthermore, in the first embodiment, although a plurality of lighting devices are coupled by a coupling holder, each of the lighting devices may be provided with a coupling mechanism 7. This coupling mechanism includes a first coupling part 71 that is provided in an outer surface of a side wall of the casing 2 of one lighting device 1 and a second coupling part 72 that is provided in the outer surface of the side wall of the casing 2 of another lighting device 1 and is coupled to the first coupling part 71.

As a specific example of the first coupling part 71 and the second coupling part 72, as shown in FIG. 12(A), for example, the first coupling part 71 is a convex portion provided on an outer surface of the side wall (e.g., a left side wall or a top side wall) of the casing 2 and the second coupling part 72 is a concave slot provided in the outer surface of the side wall (e.g., a right side wall or a bottom side wall) of the casing 2. The convex portion has a shape such that the width thereof is expanded to be wider toward the protruding direction, and the concave slot has a shape such that the width of the slot is expanded to be wider toward the depth-wise direction to be fitted to the shape of the convex portion. Thus, the convex portion is slid along the extending direction of the concave slot and engaged with the concave slot so that the lighting devices 1 are coupled.

Moreover, as shown in FIG. 12(B), the first coupling part 71 is, e.g., a pin-shaped protruded portion provided on the outer surface of the side walls (e.g., a left side wall and a top side wall) of the casing 2, and the second coupling part 72 is a concave portion formed in the outer surface of the side walls (e.g., a right side wall and a bottom side wall) of the casing 2. At this time, it is preferable to provide an elastic member (not shown in FIG. 12) on an inner circumferential surface of the concave portion in order that the elastic member is closely fixed to the protruded portion when the protruded portion is engaged with the concave portion.

By mutually coupling two respective adjacent lighting devices in a manner that the first coupling part 71 and the second coupling part 72 are engaged with each other, the lighting devices 1 can be vertically and horizontally coupled to be combined. In the case where the lighting devices 1 are coupled only in one line, it is sufficient that the first coupling part 71 and the second coupling part 72 are provided only in a pair of opposing surfaces (e.g., right and left side walls) in a pair of two adjacent casings 2. Further, in the case of coupling only two lighting devices 1, it is sufficient that the first coupling part 71 and the second coupling part 72 are respectively provided only in one of the surfaces of the casings 2 of the respective lighting devices 1.

Further, by blinking each of the lighting devices or each of the unit groups regularly or randomly or by dimming each of the lighting devices regularly or randomly, for example, a pattern projected on an object can be varied regularly or randomly and a representativeness can be also increased.

Furthermore, the position adjusting mechanism is provided in the first embodiment, in the case where an object is far distant (several hundred meters ahead) and it is considered that a variable range of an image-forming position is included in an error range, the position adjusting mechanism can be unnecessary.

Second Embodiment

Next, the following describes a light irradiating unit (lighting device) 1 for generating a line such as, e.g., a stop line, a road side line and a center line on a road by an illumination. Reference symbols for use in the second embodiment are different from those in the first embodiment.

<Device Configuration>

A road line generating lighting device 1 pertaining to the present embodiment is used for generating a line L showing a road marking such as, e.g., a center line in a tunnel by an illumination.

Figure 13:
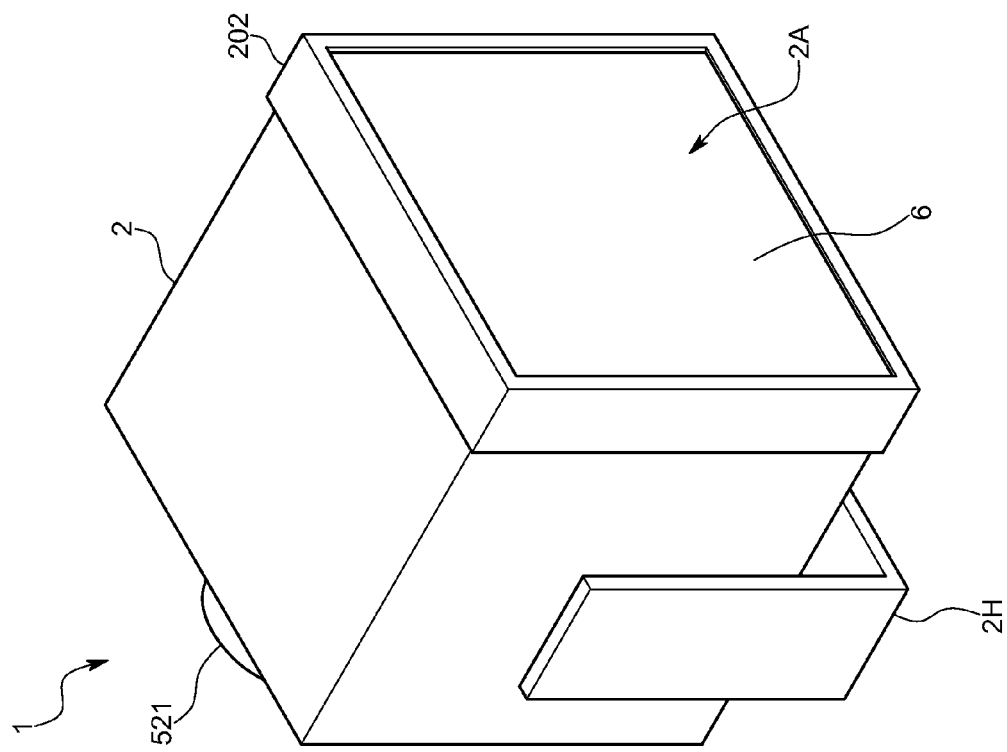
FIG. 13 is a schematically perspective view of a road line producing lighting device according to a second embodiment of the present invention.

As shown in a perspective view of FIG. 13, the road line generating lighting device 1 has a generally cubic contour and includes a casing 2, an LED light source 3, a Fresnel lens 4 that is a first refractive element, a lenticular lens 11 that is a second refractive element and a position adjusting mechanism 5 for adjusting a distance between the LED light source 3 and the Fresnel lens 4.

Each of the parts 2, 3, 4, 5 and 11 is explained. The casing 2 is a cubic shaped thin-walled box body with one face opened and, as shown in an inner sectional view of FIGS. 14 and 15, the Fresnel lens 4 and the lenticular lens 11 are fitted to a light outgoing aperture 2A, and the LED light source 3 and the position adjusting mechanism 5 are attached to an inner side surface of an opposing face to the aperture 2A. Further, a power source box 12 is provided inside the casing 2, and a generally C-shaped installation stage 2H is rotatably provided on the outer side surface of the casing 2. The installation stage 2H is omitted in FIGS. 14, 15 and 17 for brevity.

Figure 16:
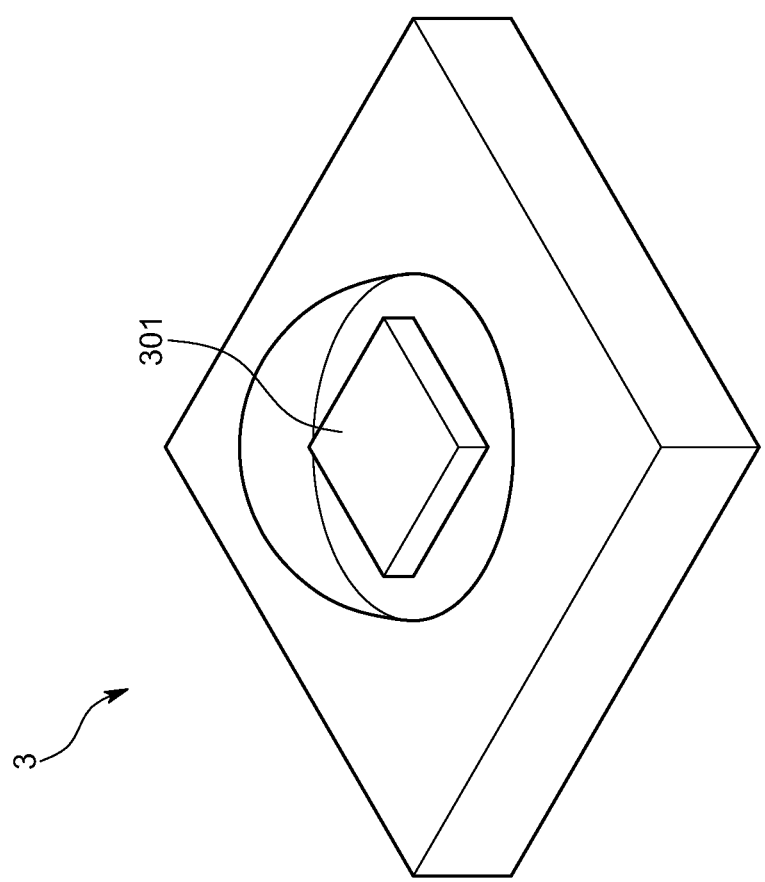
FIG. 16 is a schematically perspective view showing an LED light source according to the same embodiment.

A chip type LED is used as the LED light source 3 and, as shown in FIG. 16, a light emitting shape of a light emitting surface when viewed in the optical axis direction is a square shape. The LED light source 3 is provided generally at a center portion of one face of the casing 2 and is located outside a focus of the Fresnel lens 4 and the location thereof is adjusted by the position adjusting mechanism 5 such that an image of the outgoing light from the Fresnel lens 4 is formed on the road.

The Fresnel lens 4 is adapted to refract the incident light to thereby form an image thereof at a predetermined position. The distance between the Fresnel lens 4 and the LED light source 3 is adjusted by the position adjusting mechanism 5 so that the image is formed on the road.

The lenticular lens 11 is so provided as to be contacted with a front surface of the Fresnel lens 4 in the optical axis direction. The configuration thereof is formed by arranging multiple thin semicircular cylindrical shaped barrel-like lenses. Thus, the lenticular lens 11 is arranged in a manner that the axis direction of the barrel-like lenses and the extending direction of a pair of opposing sides of the light emitting surface 301 of the LED light source 3 are parallel to each other. That is, in FIG. 14, since the barrel-like lenses are arranged in the vertical direction as viewed in the figure, the image of the LED light source 3 formed on the road with the outgoing light from the LED light source 3 is in a state of being extended vertically. An acrylic lens cover is provided forward in the optical axis direction of the lenticular lens 11, and the lenticular lens 11 and the lens cover 6 are fixed by securing between a lens depressing plate 201 provided at a central portion of each side in the aperture portion 2A of the casing 2 and a front frame 202 provided in a manner of covering a circumference from an outer surface of the aperture 2A.

The position adjusting mechanism 5 includes a plate-shaped heat sink 51 attached to the LED light source 3, a feed screw mechanism 52 attached to the heat sink 51 for moving the heat sink 51 back and forth along the optical axis direction, and a guide rod 53 for guiding the heat sink 51 so as to be moved only back and forth.

Figure 14:
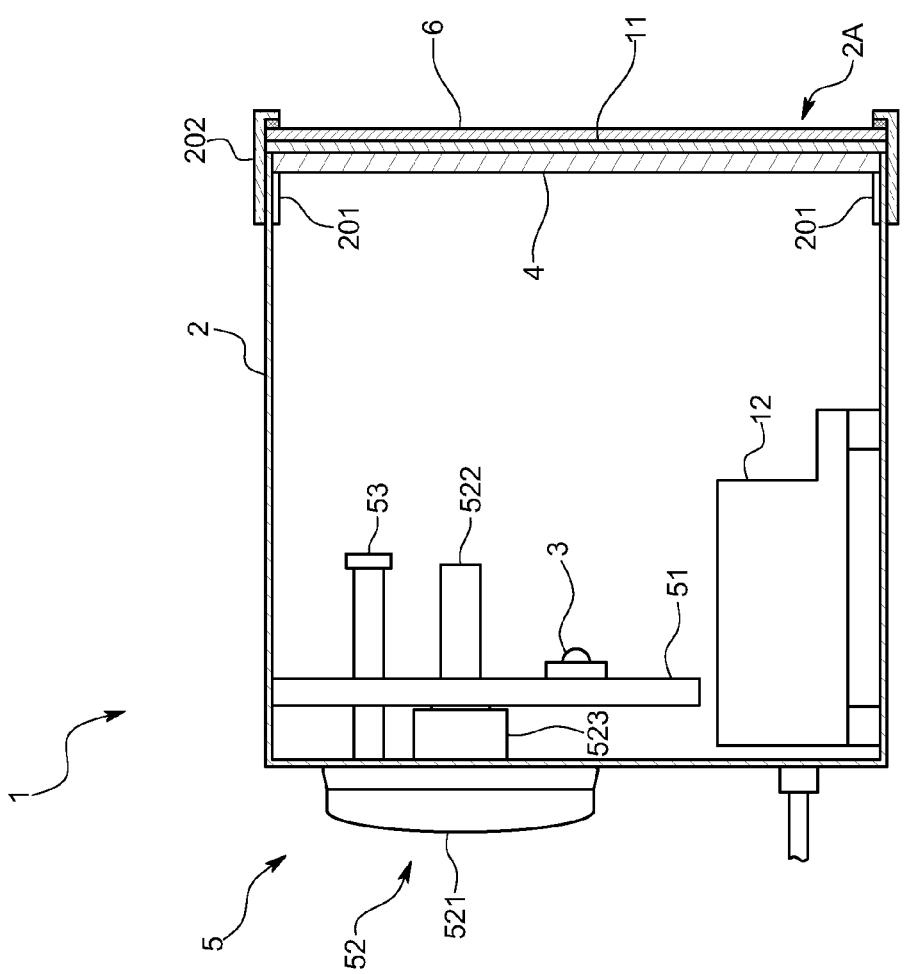
FIG. 14 is a schematic section view showing an internal configuration of the road line producing lighting device according to the same embodiment.
Figure 15:
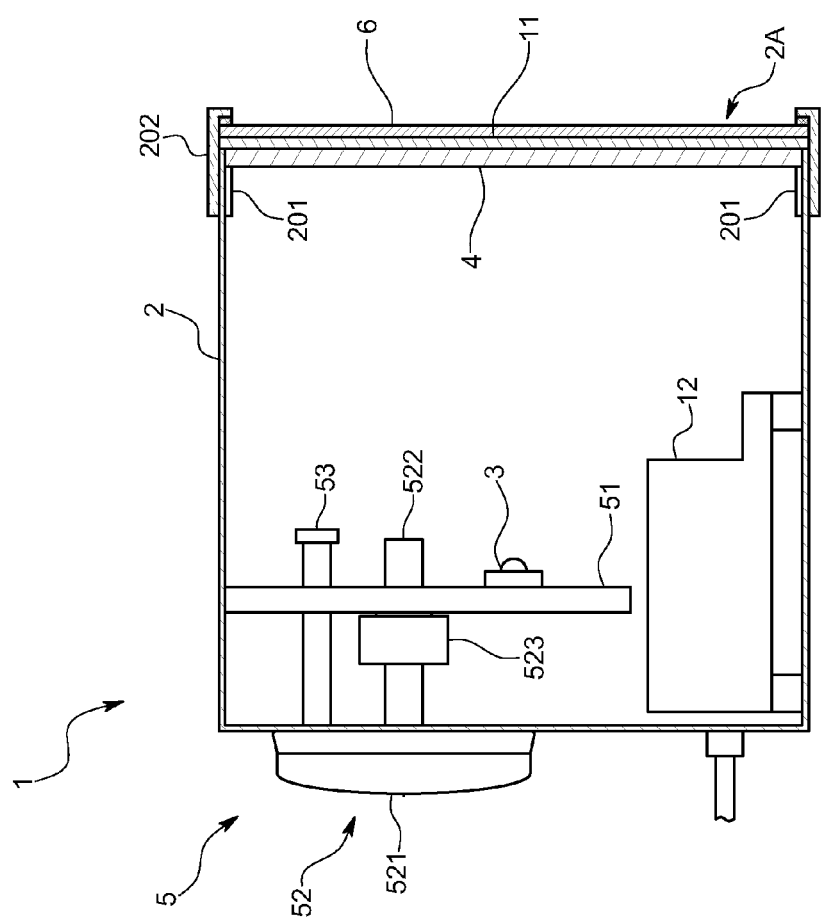
FIG. 15 is a schematic section view showing an action of a position adjustment mechanism according to the same embodiment.

Referring to each part more specifically, as shown in FIGS. 14 and 15, the feed screw mechanism 52 is so provided as to penetrate a generally central portion of the heat sink 51 and the LED light source 3 is attached to the heat sink 51 below the feed screw mechanism 52. The guide rod 53 is so provided as to penetrate the heat sink 51 along the optical axis direction above the feed screw mechanism 52. The feed screw mechanism 52 includes a handle part 521 provided outside the casing 2, a threaded part 522 that is coupled to the handle part 521 and inwardly protruded, and a nut part 523 screwed with threaded part 522, wherein the nut part 523 is fixed to the heat sink 51. Hence, as shown in FIG. 15, since the nut part 523 is moved with respect to the threaded part 522 by rotating the handle part 521, the LED light source 3 can be moved back and forth along the optical axis direction according to the rotation of the handle part 521. Moreover, the length of the threaded part 522, the length of the guide rod 53 and the size of the power source box 12 are configured so as not to block an optical path even in the case where the LED light source 3 is positioned at the backmost in the casing 2 (i.e., in a state that the LED light source 3 is positioned farthest from the Fresnel lens 4).

Next, the following describes a setting, a state and the like in the case of generating a center line using the road line generating lighting device 1 as configured above.

Figure 17:
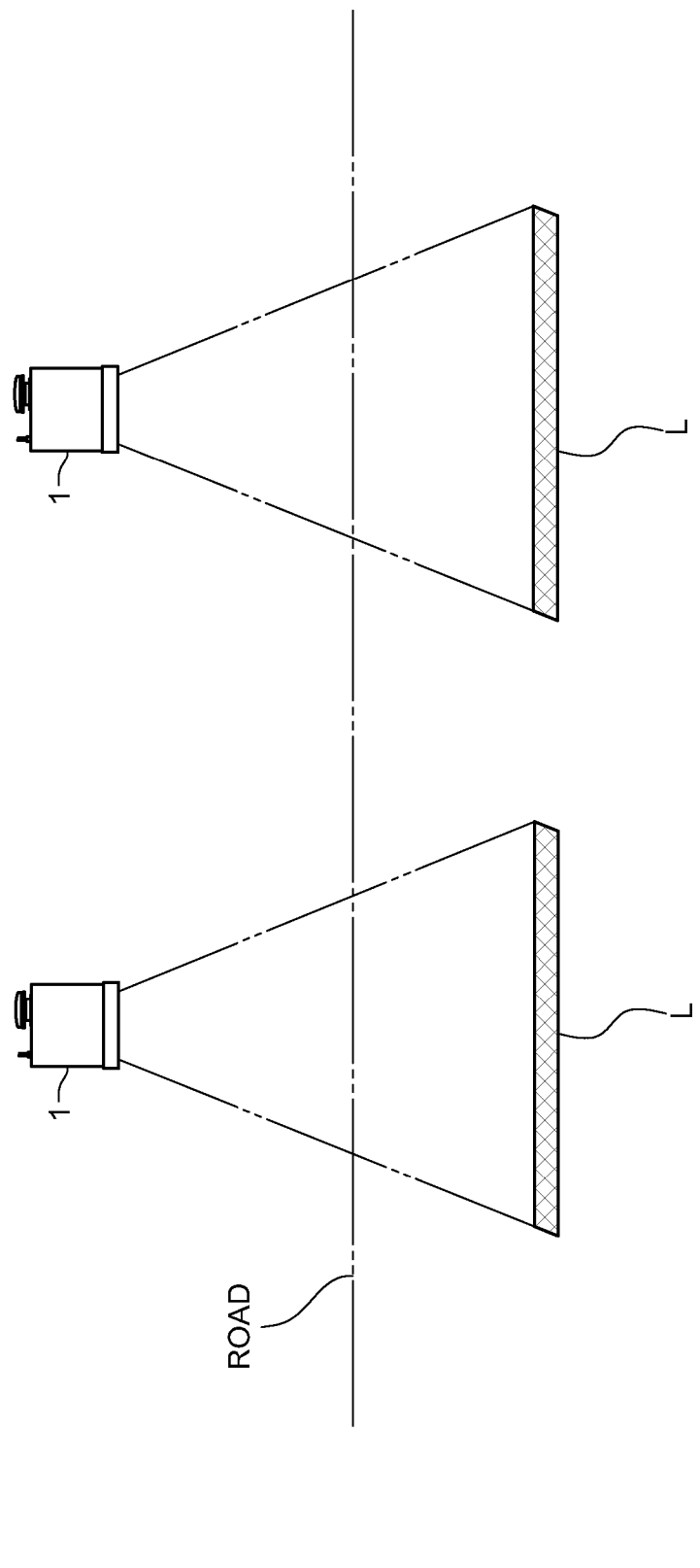
FIG. 17 is a schematic diagram showing a usage state of the road line producing lighting device according to the same embodiment.

In the present embodiment, as shown in FIG. 17, the explanation is made in the case of forming an image of one line L on the road using one road line generating lighting device 1. That is, in the case where it is necessary to display a center line by a dotted line, it is necessary to prepare a number of road line generating lighting devices 1, as much as the number of white line portions.

Figure 18:
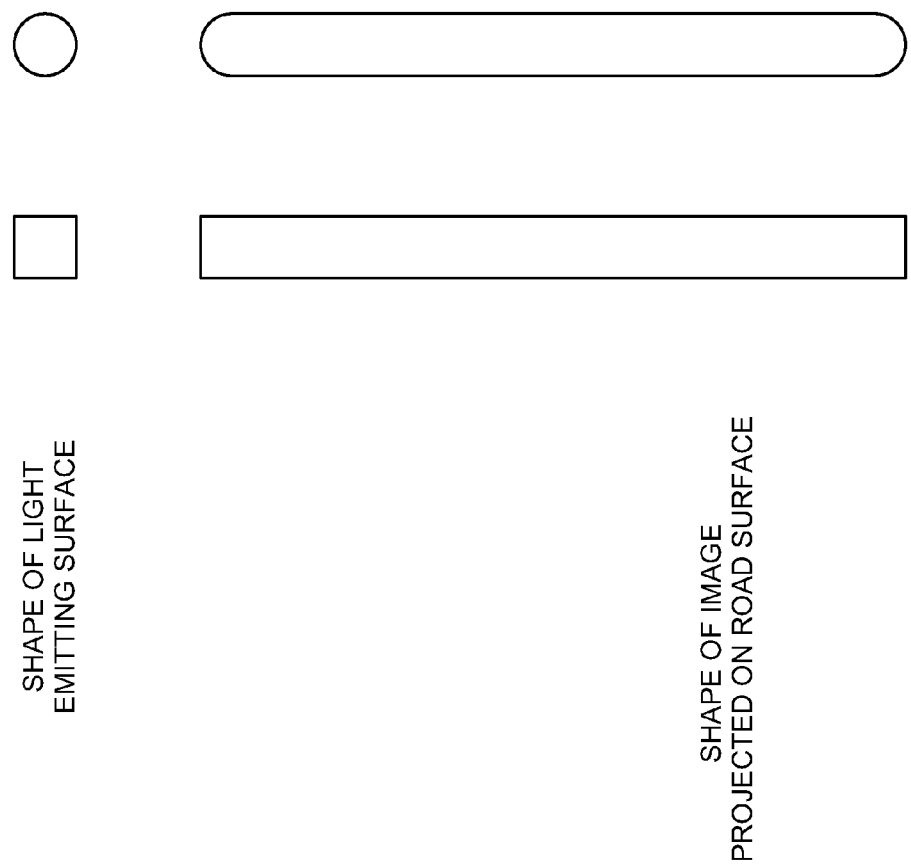
FIG. 18 is a schematic diagram showing a shape of a light emitting plane of the LED light source and an image projected onto a surface of a road according to the same embodiment.

In each of the road line generating lighting devices 1, the distance between the LED light source 3 and the Fresnel lens 4 is adjusted by the position adjusting mechanism 5 in accordance with a distance from the lighting device 1 per se to the road surface of the road so that a real image of the LED light source 3 is formed on the road surface. Meanwhile, the lenticular lens 11 disperses the light only in the one-dimensional direction. Thus, the real images, i.e., square light of the LED light sources 3 are infinitely formed in a direction of the lines L desired to be drawn by the lenticular lens 11 while partially overlapping, and this results in that, as shown in FIG. 18 (a), an image is formed as one rectangular line L. For example, as shown in FIG. 18 (b), also in the case of using the LED light source 3 having a circular light emitting surface 301, the line L can be formed. However, there appears a circular shape as shown in FIG. 18(b). That is, as shown in FIG. 18 (a), if a light source having a quadrangle shape (including a rectangular shape) light emitting surface 301 is used as the LED light source 3, it is simple and easy-to-use to generate a line having a shape close to a rectangular shape which is frequently used to be displayed on the road.

Effect of Second Embodiment

Conventionally, it has been considered that, in order to project a rectangular line L onto a road surface, the LED light source 3 is needed to be placed at a focus position of the Fresnel lens 4 so that the outgoing light rays from the lens are collimated, whereas in the road line generating lighting device 1 in the present embodiment, instead of adapting this conventional technique, the LED light source 3 per se is image-formed to thereby generate a line L, and this idea is quite different from that of the conventional one.

More specifically, in the configuration of the present embodiment, while the outgoing light from the LED light source 3 having a quadrangle shaped light emitting surface 301 is being image-formed on the road through the Fresnel lens 4, the infinite number of the images thereof while being partially overlapped are aligned to be extended in a predetermined direction by the lenticular lens 11, whereby the line L with a clear contour can be projected onto a road surface even if a distance between the LED light source 3 and the road surface is large. Thus, the line L can be remarkably cleared in visibility compared to a conventional case where a contour of the line is blurred and good visibility for a driver is not obtained when the collimated lights are irradiated onto a road surface to thereby project a line L on the road.

Moreover, since one line L can be formed only by one LED light source 3, one Fresnel lens 4 and one lenticular lens 11, the line L with good visibility can be formed with a very simple configuration while reducing the number of parts.

It is noted that the present invention is not limited to the second embodiment. In the following description, similar parts to those in the second embodiment are designated by the same reference symbols.

For example, in the second embodiment, although the LED light source, the Fresnel lens serving as the first refractive element and the lenticular lens serving as the second refractive element are aligned in this order in the casing, the arrangement of the LED light source, the second refractive element and the first refractive element may be aligned in this order. Further, the second refractive element is not limited to the lenticular lens, a linear Fresnel lens and the like may be used. Namely, in brief, any element having a function of extending the light in a predetermined direction may be used.

Further, although the lighting device of the second embodiment is adapted to generate a road line, the lighting device may be used for generating a line on a wall surface of a building and the like other than a road.

Moreover, although the second refractive element in the second embodiment has a function of extending light in a one-dimensional direction, a transparent phase modulation typed diffractive optical element (e.g., a holographic diffractive optical element fabricated by micromachining a glass plate or an acryl plate and the like) may be used to extend the light in a two-dimensional direction to thereby irradiate light of a predetermined shape. For example, a holographic diffractive optical element for generating a quadrangle frame shape is used as the second refractive element, whereby a quadrangle frame shaped light can be irradiated at a predetermined distance position that is an image-forming position of the first refractive element. Further, it may be configured to irradiate a rectangular frame and the like by combining a plurality of lighting devices for irradiating lines.

In the second embodiment, although the first refractive element and the second refractive element are differently implemented by a Fresnel lens and a lenticular lens, respectively, it may be implemented by, e.g., a single acryl plate provided with a Fresnel lens formed on one surface thereof and a lenticular lens formed on the other surface thereof. With this configuration, the number of parts can be reduced and a working for overlaying two plates accurately at the time of assembling can be eliminated so that the productivity can be improved.

In the second embodiment, although the light emitting surface of the LED light source is square shaped, the other shaped one may be used. For example, even a circular light emitting surface may be use to form a generally rectangular shaped image by adjusting intervals of the overlaying and image-formation by the lenticular lens, and also may be used in such a case where more or less irregularity is permissible.

Although the LED light source in the second embodiment includes only one LED chip, it may include a plurality of LED chips. In the second embodiment, in the case where four chips are arranged as shown in FIG. 19(*a*), two lines are projected onto the road surface. Also, the LED light source may be attached in a state of being inclined with respect to a direction of aligning the barrel-like lenses of the lenticular lens. For example, as shown in FIG. 19(*b*), if the LED chips are attached while being inclined in the second embodiment, there may be formed a line on the road surface while at least an intermediate portion thereof is thickened. That is, the number of the LED chips and the orientation thereof may be varied according to a shape of the line formed on the road surface. Further, by arranging the plurality of LED light sources in a manner that the optical axis directions thereof are different (in particular, an arrangement that the optical axes are made radial), a configuration of forming a single line may be adopted.

Moreover, although the distance between the LED light source and the lenticular lens is adjustable, an inclination adjusting mechanism may be further provided for adjusting an inclination of the LED light source with respect to the lenticular lens. With such a configuration, the thickness and the like of the line to be projected can be varied as shown in FIG. 19(*b*).

Figure 20:
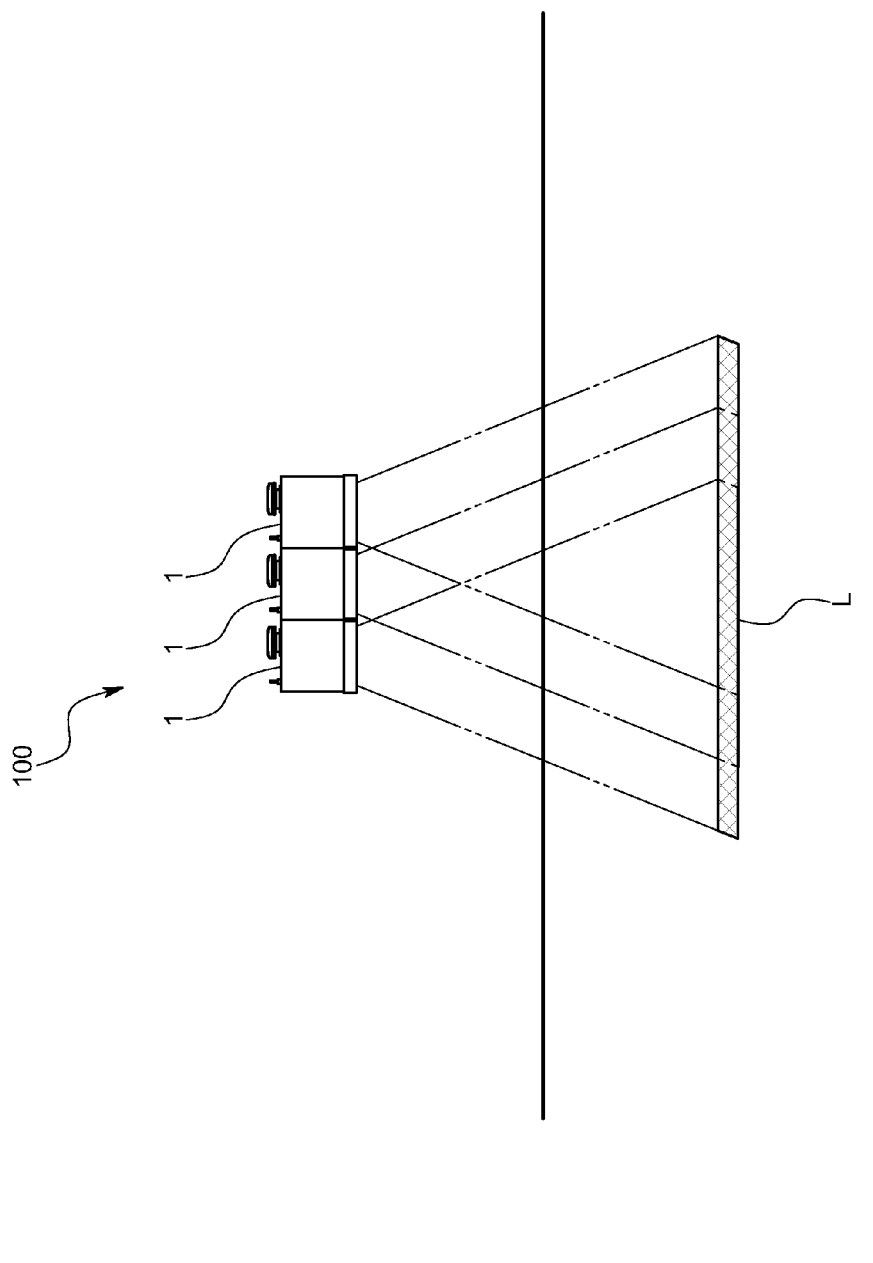
FIG. 20 is a schematic diagram showing an image projected on a surface of a road in a road line producing lighting device according to another embodiment of the present invention.

As shown in FIG. 20, the road line generating lighting system 100 may be configured by preparing a plurality of the road line generating lighting devices 1 and providing the same in alignment such that the predetermined directions of extending the light by the respective second refractive elements 5 are coincident. Based on the second embodiment mentioned above as shown in FIG. 20, since the casing 2 is generally cubic shaped, it is easy to provide the road line generating lighting devices 1 in the predetermined direction while adjoining, and further a light intensity of the line L can be improved by superimposing the lights outgoing from the respective line generating lighting devices 1. Thus, the line can be made more conspicuous in an environment and the like in which a visibility is in particular required. Further, not only the light intensity but also the length of the whole line can be increased. In FIG. 20, although the respective road line generating lighting devices 1 are arranged in close contact with each other, they may be slightly spaced from each other. Namely, to be brief, it may be sufficient that the road line generating devices 1 are arranged such that the lines L formed by the lights outgoing from the respective road line generating lighting devices 1 are overlaid to thereby configure the road line generating lighting system 100.

Not only generating a center line etc. but also a figure or a character used for road markings may be generated using, e.g., a plurality of road line generating lighting devices. In particular, a×mark and a C-character etc. may be generated with a plurality of lines.

In the second embodiment, although a line is directly projected onto a road surface, in the case where the road is covered with snow and the like, the term "road surface" of the present invention means a concept indicating a surface of the snow and the like.

Third Embodiment

Next, the following describes a third embodiment of the present invention that shows a modified example of the lighting device 1 pertaining to each of the first and second embodiments.

Figure 21:
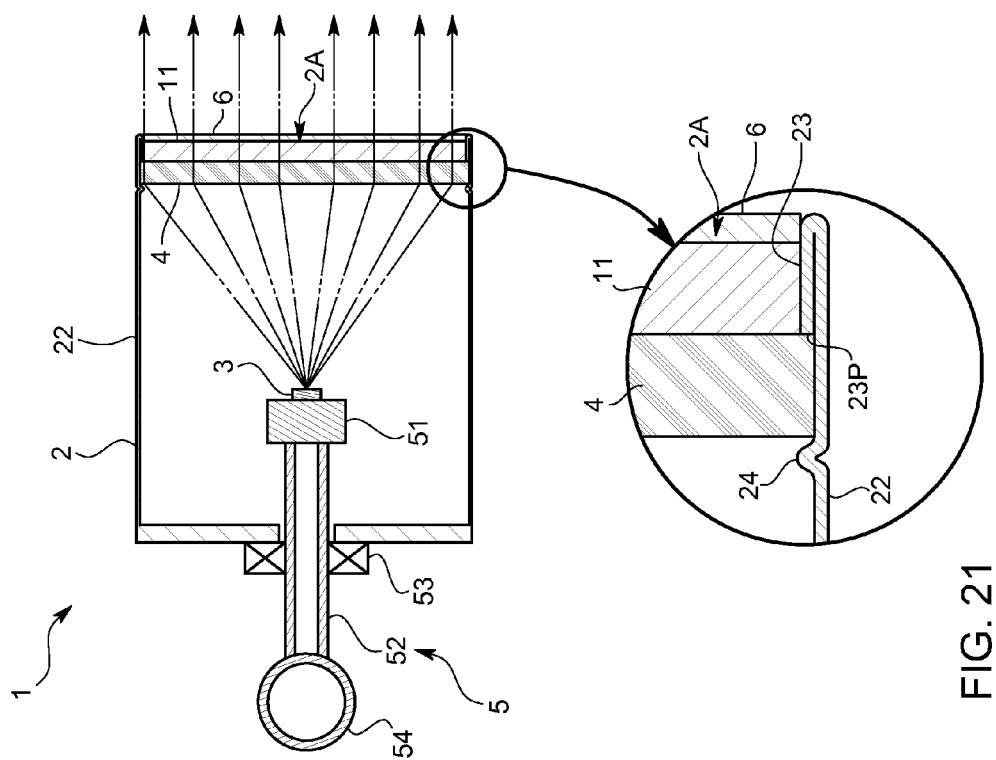
FIG. 21 is a schematic section view of a lighting device according to a third embodiment of the present invention.

As shown in a partially enlarged view of FIG. 21, the casing 2 of the lighting device 1 in the present embodiment includes a lens abutment surface 23P provided on a folded part 23 formed by folding an end portion of a side wall 22 which defines an aperture portion 2A and further includes a positioning protrusion 24 for positioning and fixing the Fresnel lens 4 in a state that the Fresnel lens 4 is engaged toward the lens abutment surface 23P and brought into contact with the lens abutment surface 23P.

The folded part 23 of the present embodiment is formed by folding the casing side wall 22 about 180 degrees so that the side surface of the folded part 23 is generally in close contact with an inner surface of the casing side wall 22. The folded part 23 is formed over the entire end portion of each of the side walls 22 of the casing 2.

With the folded part 23 configured as mentioned above, the lens abutment surface 23P is formed of a tip end surface of the folded part 23.

The positioning protrusion 24 is formed by bowing a part of each side wall 22 of the casing 2 inward by press working. In particular, a plurality of positioning protrusions 24 are provided on every side wall 22 of the casing 2. The positioning protrusion 24 is provided at a distance in a degree of a thickness of the Fresnel lens 4 to be fixed from the tip end surface of the folded part 23 (i.e., lens abutment surface 23P). Thus, the Fresnel lens 4 fixed by the positioning protrusion 24 is subjected to a pressing force from the positioning protrusion 24 toward the lens abutment surface 23P in a state the Fresnel lens 4 is in contact with the lens abutment surface 23P.

Finally, a method of attaching the Fresnel lens 4, the linear Fresnel lens 11 and a protection cover 6 in the lighting device 1 configured like this will be explained.

Initially, the casing 2 is molded using a sheet metal. At this time, the folded part 23 is formed by folding an end portion of the side wall which defines the aperture portion 2A by press working and the positioning protrusion 24 is also formed at the same time.

After the Fresnel lens 4 is accommodated inside the casing 2, the Fresnel lens 4 is moved from a side of the positioning protrusion 24 toward a side of the lens abutment surface 23P within the casing 2. Then, the Fresnel lens 4 is moved over the positioning protrusion 24 and then brought in contact with the lens abutment surface 23P immediately after the Fresnel lens 4 is moved over the positioning protrusion 24. Thus, the Fresnel lens 4 is positioned and fixed. Subsequently, the linear Fresnel lens 11 is engaged in the aperture portion 2A defined by the folded part 23 from a front of the light outgoing side of the Fresnel lens 4 so as to be fixed in a state of being in contact with the Fresnel lens 4. Subsequently, the protection cover 6 is engaged in the aperture portion 2A defined by the folded part 23 from a front of the light outgoing side of the linear Fresnel lens 11 so as to be fixed in a state of being in contact with the linear Fresnel lens 11. At this time, although a clearance is formed between the folded part 23 and the protection cover 6, adhesive is filled between the folded part 23 and the linear Fresnel lens 11 and the protection cover 6 using the clearance. Thus, the linear Fresnel lens 11 and the protection cover 6 can be fixed to the casing 2 so as to be able to seal the rectangular shaped aperture portion 2A which is hard to be provided with a seal member such as an O ring.

Effect of Third Embodiment

According to the lighting device 1 pertaining to the present embodiment configured like this, merely by engaging the Fresnel lens 4 to be brought into contact with the lens abutment surface 23P, not only the Fresnel lens 4 can be positioned but also, since the Fresnel lens 4 is then fixed by the positioning protrusion 24, the Fresnel lens 4 can be positioned and fixed to the casing 2 without applying a cutting process to the casing 2 or providing an additional fixing member (tightening tool). Therefore, the configuration of the lighting device 1 can be made simple and the Fresnel lens 4 can be easily attached and positioned to the casing 2 with reduction in cost.

It is noted that the present invention is not limited to the third embodiment. In the following description, similar parts to those of the third embodiment are designated by the same reference symbols.

For example, in the third embodiment, although the configuration of holding only the Fresnel lens between the lens abutment surface and the positioning protrusion is adopted, other configurations of holding the Fresnel lens and the protection cover, the Fresnel lens and an optical filter (intensity filter, phase filter or polarizing filter) and the protection cover, the Fresnel lens and the diffractive optical element (linear Fresnel lens or holographic diffractive optical element), the Fresnel lens and the optical filter and the diffractive optical element, the Fresnel lens and the optical filter and the diffractive optical element and the protection cover, and the Fresnel lens and the optical filter and the diffractive optical element and the optical filter and the protection cover between the lens abutment surface and the positioning protrusion may be also adopted. It is assumed that the distance between the lens abutment surface and the positioning protrusion is coincident with the total thickness of the respective members in the case of holding the respective members between the lens abutment surface and the positioning protrusion. Further, an anti-reflection coating or an anti-fog coating may be applied to a flat surface of the lens or the protection plate, alternatively, an anti-reflection process or an anti-fog process may be implemented by providing an anti-reflection film or an anti-fog film.

Moreover, although the lens abutment surface in the third embodiment is formed of a tip end surface of the folded part, it may be formed of an inner surface of the folded part in the case where the folded part is formed in a state of being folded generally at right angles with respect to the side wall of the casing.

Further, although the positioning protrusion in the third embodiment is formed by bowing a part of each side wall of the casing inward by press working, the positioning protrusion may be formed by attaching a member for forming another different positioning protrusion to an inner surface of the side wall of the casing.

In addition, although the casing in the third embodiment is a rectangular tube shape such as cubic shaped with one face entirely opened, it may be cylindrically shaped other than that.

Fourth Embodiment

Next, a fourth embodiment will be described referring to FIGS. 22 and 23 regarding a line generating method for generating a line on a flat surface W such as a ceiling surface, a wall surface and a floor surface of a structure using a lighting device 1 explained in the first and third embodiments.

Figure 22:
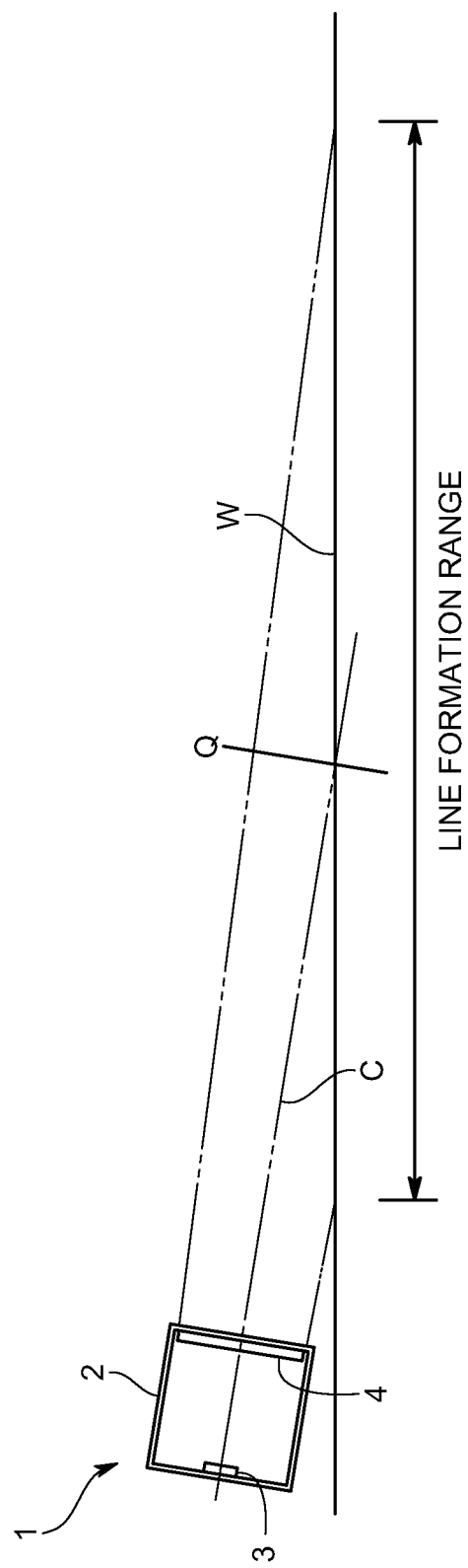
FIG. 22 is a diagram showing a line producing method according to a fourth embodiment of the present invention.
Figure 23:
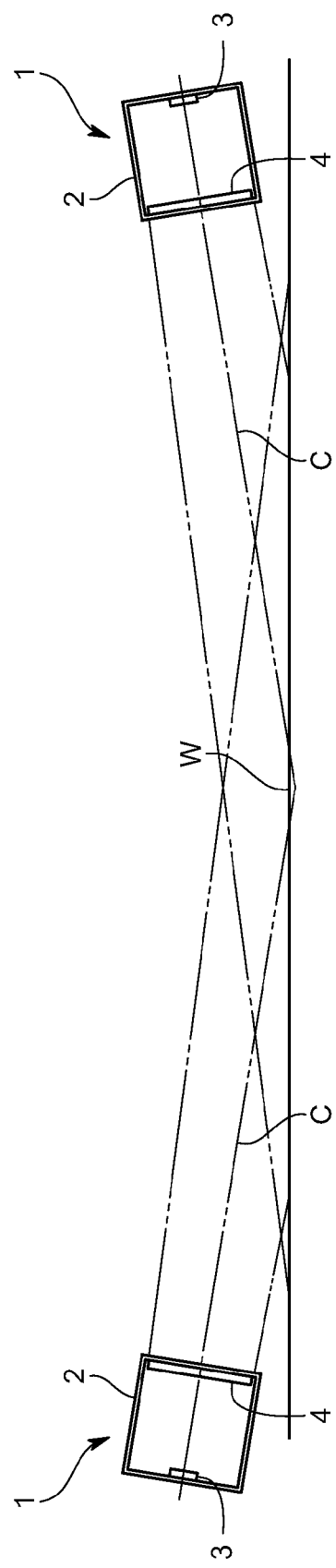
FIG. 23 is a diagram showing a line producing method according to a modified embodiment.

In this line generating method, as shown in FIG. 22, the lighting device 1 is placed in a manner that an optical axis C thereof is inclined to the flat surface W such as a wall surface that is an irradiation targeted surface. In particular, the lighting device 1 is placed in a manner that the optical axis C forms an acute angle (e.g., in a range of 0 to 10 degrees) with respect to the flat surface W. Then the lighting device 1 is set such that an image of the light emitting surface 301 of the LED light source 3 is formed at a predetermined position on the irradiation targeted surface W by the lighting device 1 so as to form a line on the flat surface W in a predetermined range of both back and forth sides of an image-forming position Q.

As a method of inclining the optical axis C of the lighting device 1 with respect to the irradiation targeted surface W, there may be considered a method of, for example, adjusting an installation angle of the lighting device 1 (see FIG. 22), and a method of using the lighting device 1 while a relative positional relationship between the optical axis of the LED light source and the optical axis of the Fresnel lens is shifted such as a method of moving the position of the LED light source in parallel to the Fresnel lens or a method of using the lighting device 1 while the optical axis center position of the Fresnel lens displaced with respect to the optical axis of the LED light source.

Herein, a specific example of the lighting device 1 is explained. A square shaped aperture portion (light outgoing aperture) having each side of 96 mm is formed in a square shaped rectangular tube type casing processed by sheet-metal working having one side of 100 mm with a thickness of 1 mm. A square shaped Fresnel lens having a focal length of 100 mm, a thickness of 2 mm and one side of 98 mm as the first refractive element is held using the lens abutment surface of the folded part formed by sheet-metal folding process and the positioning protrusion, and then an acryl plate as a square shaped protection cover having a thickness of 5 mm and one side of 96 mm is engaged in the aperture portion while being in close contact with the Fresnel lens. A sealing adhesive is filled between the acryl plate and the folded part in order for instituting a water-proof measure. Further, an anti-reflection process and an anti-fog process are implemented on the surface of the acryl plate. A square shaped and surface mounting typed high intensity white-colored LED having one side of 2 mm is used as the LED light source, which includes a mechanism for making the distance between the light emitting surface 301 and the lens surface variable.

In order that an image of the light emitting surface of the LED light source 3 of the lighting device 1 is enlarged and formed at a image-forming position Q=5 m, a distance a between the light emitting surface of the LED light source 3 and the principal point surface of the Fresnel lens 4 is adjusted to be represented by a=100×5000/(5000−100)=102.04 mm. The size A of the enlarged image of LED light source 3 is represented by A=2×5000/102.04=98 mm. The inclination of the optical axis C of the lighting device 1 is adjusted to be 0.57 degrees with respect to the flat surface W in order that the central portion of the enlarged image-formed light emitting surface is positioned at the image-forming position Q on the flat surface W that is 5 m away from the lighting device 1 in a state that the lighting device 1 is close to the flat surface W. At this time, a width of the line formed on the wall surface is 98 mm at the image-forming position Q so that the edge portion (contour) thereof can be made clear. The central lower portion of the enlarged image-formed LED light source 3 illuminates a wall surface portion between the lighting device 1 and the enlarged image-forming position Q in a line shape, and the central upper portion of the light source illuminates a wall portion farther away than the enlarged image-forming position Q in a line shape, and hence a line of approximately 10 m long can be formed on the wall surface. At this time, as the line light goes away from the image-forming position Q, the edge portion (contour) of the line becomes blurred. Meanwhile, in the case where an image of the light emitting surface of the LED light source 3 is enlarged and formed at a distance of the image-forming position Q=10 m, the top edge portion of the enlarged image-formed light emitting surface may be positioned at a position on the flat surface W, 10 m away from the lighting device 1. In this case, the edge portion (contour) of the line can be made clear at the position 10 m away from the lighting device 1.

Effect of Fourth Embodiment

According to the line generating method pertaining to the present embodiment configured as described above, a line can be formed on the flat surface W using the lighting device 1 having an image-forming optical system. Further, the line is formed in a predetermined range of both back and forth sides of the image-forming position Q so that the edge portion (contour) of the line can be made clear. In particular, since the LED light source of the lighting device 1 is rectangular shaped, the light intensity distribution of the line can be made rectangular so that the contour can be made clear. Moreover, since the casing 2 is formed of sheet metal, the light outgoing aperture of the lighting device 1 can be made approximately flat surface as soon as possible so as to be able to illuminate from the vicinity of the lighting device 1.

It is noted that the present invention is not limited to the fourth embodiment.

For example, in order to increase the uniformity of the brightness of the formed line and increase the length of the line, a pair of lighting devices 1 may be opposed in arrangement so that the lines formed by the respective lighting devices 1 are partially or entirely overlaid. Thus, even if a person or the like enters between the opposed lighting devices 1, the line does not disappear due to a shadow of the person.

Moreover, in order to increase the width of the line, a plurality of lighting devices 1 may be coupled in arrangement. Further, in order to increase a representativeness, another lighting device 1 emitting a different color light may be coupled in arrangement, and the illumination colors of the opposed lighting devices 1 are differentiated while the lighting devices 1 emitting lights of different colors are coupled in arrangement, a multi-colored image can be formed.

Furthermore, by changing the optical axis angle of the lighting device with respect to an illumination targeted surface in time basis, the length of the line can be dynamically changed and the representativeness can be increased. Moreover, by changing the arrangement of a line of each lighting device using a plurality of lighting devices, a×mark, ☐mark and a simple character can be formed on the illumination targeted surface.

INDUSTRIAL USABILITY

According to the present invention, a desired figure, character and the like can be irradiated on an object with a simple configuration, and further the figure, character and the like can be easily changed.

What is claimed is:

1. A lighting device for forming a pattern comprising:
   an LED light source using an LED light emitting element;
   a first refractive element adapted to refract light emitted from the LED light source to form an enlarged image of a light emitting shape of the LED light emitting element when viewed in an optical axis direction of the LED light source at a predetermined position; and
   a casing accommodating the LED light source and the first refractive element and having a light outgoing aperture for emitting the light applied from the first refractive element to an outside of the casing.

2. The lighting device for forming a pattern according to claim 1 further comprising a second refractive element for extending the light outputted from the first refractive element in a predetermined direction and deforming the image of the light emitting shape when viewed in the optical axis direction of the LED light source to a predetermined shape.

3. The lighting device for forming a pattern according to claim 1 further comprising a distance variable mechanism for making the distance between the LED light source and the first refractive element variable.

4. The lighting device for forming a pattern according to claim 1, wherein the light emitting shape when viewed in the optical axis direction of the LED light source and a shape of the first refractive element are similar to each other.

5. The lighting device for forming a pattern according to claim 1, wherein the first refractive element and the light outgoing aperture have substantially a same shape so that the light emitting shape when viewed in the optical axis direction of the LED light source and a shape of the first refractive element are similar to each other.

6. The lighting device for forming a pattern according to claim 2 further comprising a plate shaped optical element, wherein the first refractive element is formed on one surface thereof and the second refractive element is formed on another surface thereof.

7. The lighting device for forming a pattern according to claim 1, wherein the casing includes:
   an abutment surface that is provided on a folded part formed by inwardly folding an edge portion which defines the light outgoing aperture so as to abut to the first refractive element; and
   a positioning protrusion for positioning and fixing the first refractive element in a state that the first refractive element is moved toward the abutment surface within the casing so that the first refractive element is in contact with the abutment surface.

8. A lighting device for generating a road line that irradiates light onto a road to form a line comprising:
   an LED light source using an LED light emitting element;
   a first refractive element adapted to refract light emitted from the LED light source to form an enlarged image of a light emitting shape when viewed in an optical axis direction of the LED light source at a predetermined position;
   a second refractive element for extending the light refracted by the first refractive element in a predetermined direction and deforming the image of the light emitting shape of the LED light emitting element when viewed in the optical axis direction of the LED light source to a predetermined shape; and
   a casing accommodating the LED light source, the first refractive element and the second refractive element,
   wherein the LED light source, the first refractive element and the second refractive element are arranged in position within the casing such that the image of the light emitting shape when viewed in the optical axis direction of the LED light source extended in a predetermined direction is formed on the road to form the line.

* * * * *